US012659737B2

(12) United States Patent
Zhu et al.

(10) Patent No.: US 12,659,737 B2
(45) Date of Patent: Jun. 16, 2026

(54) AUTHENTICATION METHOD AND COMMUNICATION APPARATUS

(71) Applicant: Huawei Technologies Co., Ltd., Shenzhen (CN)

(72) Inventors: Haoren Zhu, Shanghai (CN); Yishan Xu, Shanghai (CN); Hualin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 18/344,158

(22) Filed: Jun. 29, 2023

(65) Prior Publication Data

US 2023/0345243 A1 Oct. 26, 2023

Related U.S. Application Data

(63) Continuation of application No. PCT/CN2021/116801, filed on Sep. 6, 2021.

(30) Foreign Application Priority Data

Dec. 31, 2020 (WO) ................ PCT/CN2020/142560

(51) Int. Cl.
*H04W 12/06* (2021.01)
*H04W 12/69* (2021.01)

(52) U.S. Cl.
CPC ........... *H04W 12/06* (2013.01); *H04W 12/69* (2021.01)

(58) Field of Classification Search
CPC ..... H04L 1/1642; H04L 47/34; H04L 1/1607; H04L 41/052; H04L 41/0806; H04L 41/0894; H04L 67/34; H04L 69/24; H04L 61/103; H04L 63/0876; H04L 63/0869; H04L 2101/622; H04W 28/06; H04W 28/082; H04W 28/0865; H04W 28/09;

(Continued)

(56) References Cited

U.S. PATENT DOCUMENTS

| 12,363,676 B2 * | 7/2025 | Zhang ................... H04W 68/12 |
| 2008/0129457 A1 * | 6/2008 | Ritter .................... G07C 9/257 |
| | | 340/10.1 |

(Continued)

FOREIGN PATENT DOCUMENTS

| CN | 101641939 A | 2/2010 |
| CN | 103093170 A | 5/2013 |
| FR | 2923050 A1 | 5/2009 |

OTHER PUBLICATIONS

IEEE Std 802.15.4™—2015, "IEEE Standard for Low-Rate Wireless Networks", Dec. 5, 2015, total 708 pages.

(Continued)

*Primary Examiner* — Nathan S Taylor
(74) *Attorney, Agent, or Firm* — Slater Matsil, LLP

(57) ABSTRACT

An access network device obtains an identifier of a tag device, and determines a 3rd generation partnership project 3GPP network user identifier based on the identifier of the tag device. The access network device may further send a first message to an access and mobility management network element, where the first message includes the 3GPP network user identifier, and 3GPP network user identifier is for authenticating the tag device. The tag device may be an RFID tag, a UWB tag, a Bluetooth device, or the like.

18 Claims, 13 Drawing Sheets

(58) Field of Classification Search
CPC ..... H04W 76/15; H04W 88/06; H04W 12/06;
H04W 12/69; H04W 4/70; H04W 4/80;
H04W 8/26; H04W 12/71; H04W
12/0433; H04W 12/72; H04W 12/75;
H04W 12/47; H01L 21/6875; H01L
21/687; H01L 21/027; H01L 21/304;
H01L 21/67; H01L 21/683; G03F 7/707;
G03F 7/70975; G03F 7/7095; G03F 7/00;
G03F 7/20
See application file for complete search history.

(56)                References Cited

U.S. PATENT DOCUMENTS

| 2012/0056724 | A1* | 3/2012 | Fushimi | H04N 1/00342 |
| | | | | 340/10.51 |
| 2017/0048897 | A1* | 2/2017 | Liang | H04W 76/11 |
| 2017/0230381 | A1* | 8/2017 | Liang | H04W 60/04 |
| 2017/0359427 | A1* | 12/2017 | Liang | H04W 12/08 |
| 2018/0109633 | A1* | 4/2018 | Brzozowski | H04L 41/0806 |
| 2020/0112906 | A1* | 4/2020 | Chaponniere | H04W 40/248 |
| 2020/0236548 | A1* | 7/2020 | Escott | H04W 12/041 |
| 2020/0245229 | A1* | 7/2020 | Horn | H04W 48/10 |
| 2020/0267554 | A1* | 8/2020 | Faccin | H04W 12/06 |
| 2020/0404538 | A1* | 12/2020 | Zhu | H04L 67/30 |
| 2021/0176613 | A1* | 6/2021 | Purkayastha | H04W 4/02 |
| 2021/0176628 | A1* | 6/2021 | Chikkala | H04W 12/06 |
| 2021/0248338 | A1* | 8/2021 | Spivack | G06K 7/10831 |
| 2021/0282000 | A1* | 9/2021 | Sabouri-Sichani | |
| | | | | H04W 60/005 |
| 2021/0306855 | A1* | 9/2021 | You | G06F 21/575 |
| 2021/0364625 | A1* | 11/2021 | Li | G01S 7/0232 |
| 2022/0006643 | A1* | 1/2022 | Minematsu | G06F 7/78 |
| 2022/0046416 | A1* | 2/2022 | Suzuki | H04W 48/18 |
| 2022/0095260 | A1* | 3/2022 | Shan | H04W 60/04 |
| 2022/0104009 | A1* | 3/2022 | Baskaran | H04W 12/72 |
| 2022/0124850 | A1* | 4/2022 | Gundavelli | H04L 61/103 |
| 2022/0225093 | A1* | 7/2022 | Sasi | H04W 12/06 |
| 2022/0398286 | A1* | 12/2022 | Kim | G06F 16/2291 |
| 2022/0408243 | A1* | 12/2022 | Mattsson | H04W 12/40 |
| 2023/0037685 | A1* | 2/2023 | Han | H04L 41/0894 |
| 2024/0106636 | A1* | 3/2024 | Nix | H04L 9/0852 |
| 2024/0323006 | A1* | 9/2024 | Nix | H04L 9/0825 |

OTHER PUBLICATIONS

BS ISO/IEC 29167-19: 2019, "Information technology—Automatic identification and data capture techniques", Jul. 31, 2019, total 86 pages.
EPC™ Radio-Frequency Identity Protocols Generation-2 UHF RFID Standard, "Specification for RFID Air Interface Protocol for Communications at 860 MHz-960 MHz", Jul. 2018, total 157 pages.
ISO/IEC 24730-62, "Information technology—Real time locating systems (RTLS)—Part 62: High rate pulse repetition frequency Ultra Wide Band (UWB) air interface", Sep. 1, 2013, total 65 pages.
ISO/IEC 24730-61, "Information technology—Real time locating systems (RTLS)—Part 61: Low rate pulse repetition frequency Ultra Wide Band (UWB) air interface", Aug. 1, 2013, total 13 pages.
GS1 EPC global, "Low-Level Reader Protocol (LLRP) End-User Perspective", 2007, total 16 pages.
3GPP TS 23.501 V15.12.0 (Dec. 2020), "3rd Generation Partnership Project; Technical Specification Group Services and System Aspects; System architecture for the 5G System (5GS); Stage 2 (Release 15)", total 250 pages, Dec. 2021.
3GPP TS 33.501 V15.11.0 (Dec. 2020), "3rd Generation Partnership Project; Technical Specification Group Services and System Aspects; Security architecture and procedures for 5G system (Release 15)", total 193 pages, Dec. 2021.
A. DeKok et al., "The Network Access Identifier", Internet Engineering Task Force (IETF), Request for Comments: 7542, Obsoletes: 4282, Category: Standards Track, ISSN: 2070-1721, May 2015, total 30 pages.

* cited by examiner

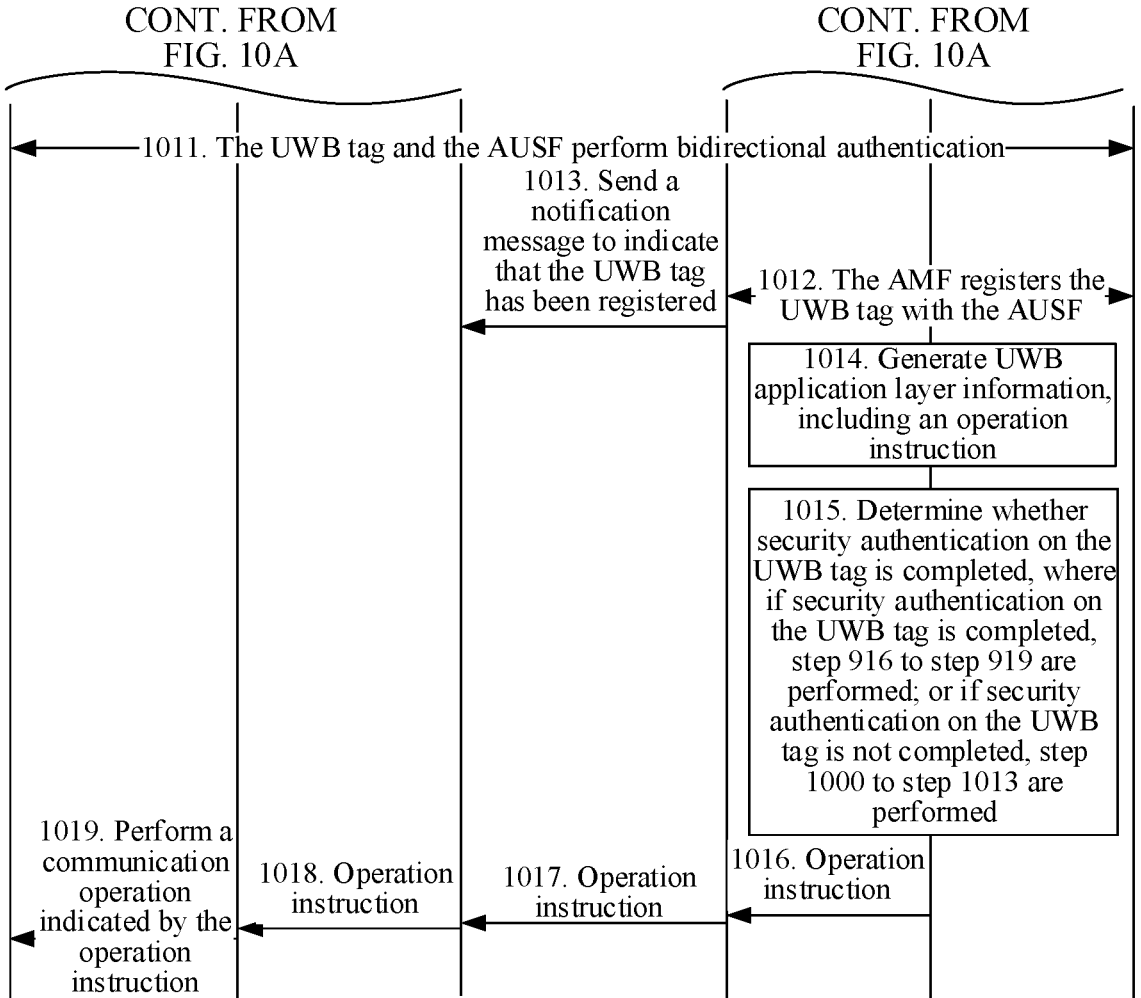

CONT. FROM
FIG. 10A

CONT. FROM
FIG. 10A

1011. The UWB tag and the AUSF perform bidirectional authentication

1013. Send a notification message to indicate that the UWB tag has been registered 1012. The AMF registers the UWB tag with the AUSF 1014. Generate UWB application layer information, including an operation instruction 1015. Determine whether security authentication on the UWB tag is completed, where if security authentication on the UWB tag is completed, step 916 to step 919 are performed; or if security authentication on the UWB tag is not completed, step 1000 to step 1013 are performed 1019. Perform a communication operation indicated by the operation instruction 1018. Operation instruction 1017. Operation instruction 1016. Operation instruction

FIG. 10B

AUTHENTICATION METHOD AND COMMUNICATION APPARATUS

CROSS-REFERENCE TO RELATED APPLICATIONS

This application is a continuation of International Application No. PCT/CN2021/116801, filed on Sep. 6, 2021, which claims priority to International Application No. PCT/CN2020/142560, filed on Dec. 31, 2020. The disclosures of the aforementioned applications are hereby incorporated by reference in their entireties.

TECHNICAL FIELD

Embodiments of this application relate to the communication field, and in particular, to an authentication method and a communication apparatus.

BACKGROUND

With the development of communication technologies, tag devices are used by an increasing quantity of enterprises and individuals. Tags can be for implementing short-distance and non-contact communication between devices.

Tag devices include radio frequency identification (RFID) tags, passive internet of things (passive IoT) tags, low power consumption devices, ultra-wideband (UWB) tags, passive terminal devices, semi-passive terminal devices, active terminal devices, reduced capability (Redcap) terminals, other internet of things devices, and Bluetooth devices. The passive terminal device is a terminal device that obtains energy from a radio frequency signal. The semi-passive terminal device is a terminal device that obtains energy from a radio frequency signal, solar energy, wind energy, or the like. The active terminal device is a device that uses a battery of the active terminal device to provide energy. At present, security authentication procedures of tag devices vary greatly from vendor to vendor. When an enterprise uses a plurality of tag devices, complexity of tag management is greatly increased.

SUMMARY

Embodiments of this application provide an authentication method and a communication apparatus, to support unified network management for a plurality of tags, and provide a unified authentication procedure to perform security authentication on a tag device, thereby reducing complexity of converged management.

According to a first aspect, an authentication method is provided. The method includes: An access network device obtains an identifier of a tag device, and determines a 3rd generation partnership project 3GPP network user identifier based on the identifier of the tag device. The access network device may further send a first message to an access and mobility management network element, where the first message includes the 3GPP network user identifier, and 3GPP network user identifier is for authenticating the tag device. The access network device may further receive an authentication result of the tag device via the access and mobility management network element. The identifier of the tag device may be an identifier that is the same as or different from the 3GPP network user identifier.

At present, there is no unified authentication process for security authentication on tag devices in convergence scenarios. Security authentication procedures of tag devices vary greatly from vendor to vendor. This greatly increases complexity of converged management. This embodiment of this application provides the authentication method. The access network device may obtain the identifier of the tag device, determine the 3rd generation partnership project 3GPP network user identifier based on the identifier of the tag device, and send the first message to the access and mobility management network element, where the first message includes the 3GPP network user identifier for authenticating the tag device. The authentication method provided in this embodiment of this application can implement authentication on different tag devices, to support unified network management for a plurality of tags, and provide a unified authentication procedure to perform security authentication on a tag device, thereby reducing complexity of converged management.

With reference to the first aspect, in a first possible implementation of the first aspect, the first message further includes type information, and the type information indicates a type of the tag device.

In this embodiment of this application, the access network device may further notify an authentication device of the type of the tag device by using the first message, so that the authentication device selects an authentication method and an authentication parameter that match the tag device.

With reference to either the first aspect or the foregoing possible implementation of the first aspect, in a second possible implementation of the first aspect, the first message is a non-access stratum NAS registration request, and the NAS registration request includes the 3GPP network user identifier.

In this embodiment of this application, the access network device may send the 3GPP network user identifier to the access and mobility management network element by using the NAS registration request.

With reference to any one of the first aspect or the possible implementations of the first aspect, in a third possible implementation of the first aspect, the access network device obtains the identifier of the tag device through an inventory process or a tag access process, where the inventory process is a tag identifier obtaining process, and the tag access process is a process of performing a read operation or a write operation on the tag device.

In this embodiment of this application, the access network device may obtain the identifier of the tag device through the inventory process or the tag access process. This provides a plurality of feasible solutions for the access network device to obtain the identifier of the tag device.

With reference to any one of the first aspect or the possible implementations of the first aspect, in a fourth possible implementation of the first aspect, the method further includes: receiving a second message from the access and mobility management network element, where the second message includes at least one of the following: a protocol parameter, a communication parameter, or an access parameter, where the protocol parameter indicates a communication protocol between the access network device and the tag device and/or a communication protocol between the access network device and a tag aggregation network element, the communication parameter is for supporting the access network device in configuring a data transmission rate and/or a decoding scheme used for communication with the tag device, and the access parameter is used by the access network device to configure a rule of a tag device access event, where the rule of the tag device access event includes at least one of the following: trigger time of the tag device access event, a periodicity of the tag device access event, or a quantity of tag devices corresponding to the tag device access event. The tag device access event is a read, write, kill, or inventory operation performed on a tag. The read operation may be reading information stored in the tag device, for example, sensor information. The inventory operation is a tag identifier obtaining operation. The tag device access may also be referred to as access of the tag device.

In this embodiment of this application, a configuration parameter related to the tag device may further be sent to the access network device, to support communication between the access network device, the tag device, and a core network, for example, signaling exchange in an authentication process.

With reference to any one of the first aspect or the possible implementations of the first aspect, in a fifth possible implementation of the first aspect, the method further includes: determining the communication protocol between the access network device and the tag device and/or the communication protocol between the access network device and the tag aggregation network element based on the second message; configuring the data transmission rate and/or the decoding scheme used for communication with the tag device; and/or configuring the rule of the tag device access event.

In this embodiment of this application, the access network device may complete local configuration based on a configuration parameter delivered by the core network, to communicate with the tag device and the core network, for example, perform signaling exchange in the authentication process.

With reference to any one of the first aspect or the possible implementations of the first aspect, in a sixth possible implementation of the first aspect, the method further includes: receiving an operation instruction from the tag aggregation network element, where the operation instruction indicates the access network device to perform a communication operation with the tag device; and performing the communication operation with the tag device according to the operation instruction.

According to the method provided in this embodiment of this application, a reader of the tag device is integrated in the core network, that is, the tag aggregation network element in this embodiment of this application. In this embodiment of this application, communication between the tag aggregation network element and the tag device via a 3GPP network is further supported. For example, an operation instruction is sent to the tag device, to indicate the tag device to perform a specific access operation, for example, a read operation or a write operation. The tag aggregation network element may be an independent core network element, or a network element deployed together with a user plane function network element UPF, the access and mobility management network element AMF, a session management network element SMF, a network exposure function network element NEF, a server, or an internet of things platform.

With reference to any one of the first aspect or the possible implementations of the first aspect, in a seventh possible implementation of the first aspect, the identifier of the tag device includes a radio access control MAC address of the tag device, a secret identifier SID of the tag device, or an electronic product code EPC of the tag device.

This embodiment of this application provides a specific implementation of the identifier of the tag device, to determine the 3GPP network user identifier of the tag device based on the identifier of the tag device.

With reference to any one of the first aspect or the possible implementations of the first aspect, in an eighth possible implementation of the first aspect, the access network device includes a tag access function module and a tag agent function module. That the access network device determines a 3GPP network user identifier based on the identifier of the tag device includes: The tag access function module obtains the identifier of the tag device, and the tag access function module sends the identifier of the tag device to the tag agent function module; and The tag agent function module determines the 3GPP network user identifier based on the identifier of the tag device.

This embodiment of this application provides a possible convergence scenario, in which the tag access function module and the tag agent function module are added to the access network device. The tag aggregation network element is a network element that is on a core network side and that supports communication with the tag device. The tag access function module supports communication between a RAN and the tag device, and the tag agent function module supports communication between the tag device and the core network element or a higher-layer tag aggregation network element.

With reference to any one of the first aspect or the possible implementations of the first aspect, in a ninth possible implementation of the first aspect, the method further includes: The tag agent function module generates first information, where the first information indicates a correspondence between the identifier of the tag device, an identifier of the tag access function module, and the 3GPP network user identifier; and the tag agent function module addresses the tag access function module based on the first information.

In this embodiment of this application, the tag agent function module may maintain and manage a plurality of tag access function modules, and the tag agent function module may address a corresponding tag access function module based on the first information when receiving downlink signaling, to transmit the downlink signaling to a corresponding tag device.

With reference to any one of the first aspect or the possible implementations of the first aspect, in a tenth possible implementation of the first aspect, the 3GPP network user identifier includes a subscription concealed identifier SUCI or a subscription permanent identifier SUPI of the tag device.

This embodiment of this application provides a possible implementation of the 3GPP network user identifier.

It should be noted that the authentication method provided in the first aspect is also applicable to a reader/writer device, that is, the reader/writer device performs a function performed by the access network device. The reader/writer device may be deployed in the access network device or a terminal device. When the reader/writer device is deployed in the access network device, the reader/writer device may also be described as the access network device. When the reader/writer device is deployed in the terminal device, the reader/writer device may also be described as the terminal device. Alternatively, the access network device may directly serve as the reader/writer device, or a terminal device may directly serve as the reader/writer device.

According to a second aspect, an authentication method is provided. The method includes: An access and mobility management network element receives a first message from an access network device, where the first message includes a 3rd generation partnership project 3GPP network user identifier of a tag device. The mobility management network element sends the 3GPP network user identifier to an authentication device, where the 3GPP network user identifier is for authenticating the tag device. The access and mobility management network element may further receive an authentication result of the tag device from an authentication device, and send the authentication result to the access network device. The identifier of the tag device may be an identifier that is the same as or different from the 3GPP network user identifier.

At present, there is no unified authentication process for security authentication on tag devices in convergence scenarios. Security authentication procedures of tag devices vary greatly from vendor to vendor. This greatly increases complexity of converged management. This embodiment of this application provides the authentication method. The access network device may obtain the identifier of the tag device, determine the 3rd generation partnership project 3GPP network user identifier based on the identifier of the tag device, and send the first message to the access and mobility management network element, where the first message includes the 3GPP network user identifier for authenticating the tag device. The authentication method provided in this embodiment of this application can implement authentication on different tag devices, to support unified network management for a plurality of tags, and provide a unified authentication procedure to perform security authentication on a tag device, thereby reducing complexity of converged management.

With reference to the first possible implementation of the second aspect, in a first possible implementation of the second aspect, the first message further includes type information, and the type information indicates a type of the tag device.

In this embodiment of this application, the access network device may further notify an authentication device of the type of the tag device by using the first message, so that the authentication device selects an authentication method and an authentication parameter that match the tag device.

With reference to either the second aspect or the foregoing possible implementation of the second aspect, in a second possible implementation of the second aspect, the first message is a non-access stratum NAS registration request, and the NAS registration request includes the 3GPP network user identifier.

In this embodiment of this application, the access network device may send the 3GPP network user identifier to the access and mobility management network element by using the NAS registration request.

With reference to any one of the second aspect or the possible implementations of the second aspect, in a third possible implementation of the second aspect, the method further includes: receiving at least one of the following from a tag aggregation network element: a protocol parameter, a communication parameter, and an access parameter, where the protocol parameter indicates a communication protocol between the access network device and the tag device and/or a communication protocol between the access network device and the tag aggregation network element, the communication parameter is for supporting the access network device in configuring a data transmission rate and/or a decoding scheme used for communication with the tag device, and the access parameter is used by the access network device to configure a rule of a tag device access event, where the rule of the tag device access event includes at least one of the following: trigger time of the tag device access event, a periodicity of the tag device access event, or a quantity of tag devices corresponding to the tag device access event; and sending a second message to the access network device, where the second message includes at least one of the communication protocol parameter, the device running parameter, and the access parameter. The tag device access event is a read, write, kill, or inventory operation performed on a tag. The inventory operation is a tag identifier obtaining operation. The read operation may be reading information stored in a tag, for example, sensor information. The tag device access may also be referred to as access of the tag device.

In this embodiment of this application, a configuration parameter related to the tag device may further be sent to the access network device via the access and mobility management network element, to support communication between the access network device, the tag device, and a core network, for example, signaling exchange in an authentication process.

With reference to any one of the second aspect or the possible implementations of the second aspect, in a fourth possible implementation of the second aspect, the method further includes: receiving a third message from the tag aggregation network element, where the third message is used by the tag aggregation network element to subscribe to a message related to the tag device from the access and mobility management network element.

In this embodiment of this application, the tag aggregation network element may further subscribe to the message related to the tag device from the access and mobility management network element, so that the access and mobility management network element can accurately route the message related to the tag device to the tag aggregation network element for processing. The tag aggregation network element may be an independent core network element, or a network element deployed together with a user plane function network element UPF, the access and mobility management network element AMF, a session management network element SMF, a network exposure function network element NEF, a server, or an internet of things platform.

With reference to either the second aspect or the foregoing possible implementation of the second aspect, in a fifth possible implementation of the second aspect, the third message includes a message type, and the message type indicates the message related to the tag device.

In this embodiment of this application, a specific implementation of subscribing to the message by the tag aggregation network element is provided. Specifically, the tag aggregation network element may subscribe to the message related to the tag device from the access and mobility management network element based on the message type.

With reference to any one of the second aspect or the possible implementations of the second aspect, in a sixth possible implementation of the second aspect, the 3GPP network user identifier includes a subscription concealed identifier SUCI or a subscription permanent identifier SUPI of the tag device.

This embodiment of this application provides a possible implementation of the 3GPP network user identifier.

According to a third aspect, an authentication method is provided. The method includes: A tag aggregation network element determines whether security authentication on a tag device succeeds. The tag aggregation network element determines that security authentication on the tag device succeeds, and sends an operation instruction to an access network device, where the operation instruction indicates the access network device to perform a communication operation with the tag device. The tag aggregation network element may be an independent core network element, or a network element deployed together with a user plane function network element UPF, an access and mobility management network element AMF, a session management network element SMF, a network exposure function network element NEF, a server, or an internet of things platform.

The authentication method provided in this embodiment of this application supports secure access of the tag device in a tag convergence scenario, and provides a unified access procedure to perform unified network management on different tag devices, thereby reducing complexity of converged management.

With reference to the third aspect, in a first possible implementation of the third aspect, that a tag aggregation network element determines whether security authentication on a tag device succeeds includes: if a 3rd generation partnership project 3GPP network user identifier corresponding to an identifier of the tag device is obtained from an authentication device based on the identifier of the tag device, determining that security authentication on the tag device succeeds.

This embodiment of this application provides a specific implementation in which the tag aggregation network element determines that security authentication on the tag device succeeds.

With reference to either the third aspect or the foregoing possible implementation of the third aspect, in a second possible implementation of the third aspect, before that the tag aggregation network element determines that security authentication on the tag device succeeds, the method further includes: The tag aggregation network element sends at least one of the following to an access and mobility management network element: a protocol parameter, a communication parameter, and an access parameter, where the protocol parameter indicates a communication protocol between the access network device and the tag device and/or a communication protocol between the access network device and the tag aggregation network element, the communication parameter is for supporting the access network device in configuring a data transmission rate and/or a decoding scheme used for communication with the tag device, and the access parameter is used by the access network device to configure a rule of a tag device access event, where the rule of the tag device access event includes at least one of the following: trigger time of the tag device access event, a periodicity of the tag device access event, or a quantity of tag devices corresponding to the tag device access event.

In this embodiment of this application, before the tag device performs secure access, the tag aggregation network element may further send a configuration parameter related to the tag device to the access network device via the access and mobility management network element, to support communication among the access network device, the tag device, and a core network, for example, signaling exchange in an authentication process.

With reference to any one of the third aspect or the possible implementations of the third aspect, in a third possible implementation of the third aspect, the method further includes: sending a third message to the access and mobility management network element, where the third message is for subscribing to a message related to the tag device from the access and mobility management network element.

In this embodiment of this application, before the tag device performs secure access, the tag aggregation network element may further subscribe to the message related to the tag device from the access and mobility management network element, so that the access and mobility management network element can accurately route the message related to the tag device to the tag aggregation network element for processing.

With reference to either the third aspect or the foregoing possible implementation of the third aspect, in a fourth possible implementation of the third aspect, the third message includes a message type, and the message type indicates the message related to the tag device.

In this embodiment of this application, a specific implementation of subscribing to the message by the tag aggregation network element is provided. Specifically, the tag aggregation network element may subscribe to the message related to the tag device from the access and mobility management network element based on the message type.

With reference to either the third aspect or the foregoing possible implementation of the third aspect, in a fifth possible implementation of the third aspect, that a tag aggregation network element determines whether security authentication on a tag device succeeds includes: if no 3rd generation partnership project 3GPP network user identifier corresponding to an identifier of the tag device is obtained from an authentication device based on the identifier of the tag device, determining that security authentication on the tag device fails.

This embodiment of this application provides a specific implementation in which the tag aggregation network element determines that security authentication on the tag device fails.

With reference to either the third aspect or the foregoing possible implementation of the third aspect, in a sixth possible implementation of the third aspect, after the determining that security authentication on the tag device fails, the method further includes: sending, by the tag aggregation network element, at least one of the following to an access and mobility management network element: a communication protocol parameter, a device running parameter, and an access parameter, where the communication protocol parameter indicates a communication protocol between the access network device and the tag device and/or a communication protocol between the access network device and the tag aggregation network element, the device running parameter is for supporting the access network device in configuring a function related to the tag device, and the access parameter is for supporting the access network device in configuring a rule for the tag device to access the access network device.

With reference to any one of the third aspect or the possible implementations of the third aspect, in a seventh possible implementation of the third aspect, the method further includes: sending a third message to the access and mobility management network element, where the third message is for subscribing to a message related to the tag device from the access and mobility management network element.

With reference to any one of the third aspect or the possible implementations of the third aspect, in a seventh possible implementation of the third aspect, the third message includes a message type, and the message type indicates the message related to the tag device.

With reference to any one of the third aspect or the possible implementations of the third aspect, in an eighth possible implementation of the third aspect, the identifier of the tag device includes a radio access control MAC address of the tag device, a secret identifier SID of the tag device, or an electronic product code EPC of the tag device.

With reference to any one of the third aspect or the possible implementations of the third aspect, in a ninth possible implementation of the third aspect, the 3GPP network user identifier includes a subscription concealed identifier SUCI or a subscription permanent identifier SUPI of the tag device.

According to a fourth aspect, a communication method is provided. The method includes: A tag device sends a core network interaction message after receiving a tag trigger signal, where the core network interaction message is for message exchange between the tag device and a core network element.

When the tag device is a passive device, the tag trigger signal is required to stimulate the tag device, so that the tag device can send the core network interaction message, to interact with the core network element; or when the tag device is in a sleep state, the tag trigger signal is required to wake up the tag device, so that the tag device can send the core network interaction message, to interact with the core network element.

In the authentication method provided in this embodiment of this application, the tag device may exchange a message with the core network element after receiving the tag trigger signal. This provides a feasible solution for interaction between the tag device and the core network element.

With reference to the fourth aspect, in a first possible implementation of the fourth aspect, the core network interaction message may include any one of the following: a registration message, a deregistration message, a session establishment request message, a session modification request message, a session deletion request message, a service request message, or a tag data sending message. The registration message is for registering a tag with a core network, the deregistration message is for deregistering a tag from the core network, the session establishment request message is for establishing a session for a tag, the session modification request message is for modifying a session for a tag, the session deletion request message is for deleting a session for a tag, the service request message is for requesting a service for a tag, and the tag data sending message is for sending tag data. The tag data may be sensor data, preset data, or the like.

With reference to either the fourth aspect or the foregoing possible implementation of the fourth aspect, in a second possible implementation of the fourth aspect, the tag trigger signal is for triggering an inventory process, the tag trigger signal is for triggering a tag access process, the tag trigger signal is for triggering a tag authentication process, the tag trigger signal is for triggering a tag locking process, the tag trigger signal is for triggering a tag killing process, or the tag trigger signal is for tag device wakeup. The inventory process is a tag identifier obtaining process, the tag access process is a process of performing a read operation or a write operation on the tag device, the tag authentication process is a process of authenticating the tag device, the tag locking process is a process of locking the tag device, the tag killing process is a process of killing the tag device, and the tag device wakeup is a process of waking up the tag device.

With reference to any one of the fourth aspect or the possible implementations of the fourth aspect, in a third possible implementation of the fourth aspect, the tag device receives filtering information; and the tag device sends the core network interaction message if the tag device matches the filtering information.

With reference to any one of the fourth aspect or the possible implementations of the fourth aspect, in a fourth possible implementation of the fourth aspect, the core network interaction message carries a tag identifier or a session identifier, and the tag identifier or the session identifier is obtained in the inventory process or the tag access process, where the inventory process is the tag identifier obtaining process, and the tag access process is the process of performing the read operation or the write operation on the tag device.

With reference to any one of the fourth aspect or the possible implementations of the fourth aspect, in a fifth possible implementation of the fourth aspect, the tag trigger signal is any one of the following: a select select command, a challenge challenge command, a query query command, a read read command, a write write command, a kill kill command, a lock lock command, and a wakeup command.

With reference to any one of the fourth aspect or the possible implementations of the fourth aspect, in a sixth possible implementation of the fourth aspect, the core network interaction message is a non-access stratum NAS message.

According to a fifth aspect, a communication apparatus is provided. The communication apparatus may be an access network device or a component in the access network device. The apparatus includes: a processing unit, configured to obtain an identifier of a tag device, and determine a 3rd generation partnership project 3GPP network user identifier based on the identifier of the tag device; and a communication unit, configured to send a first message to an access and mobility management network element, where the first message includes the 3GPP network user identifier, and the 3GPP network user identifier is for authenticating the tag device. The communication unit is further configured to receive an authentication result of the tag device via the access and mobility management network element. The identifier of the tag device may be an identifier that is the same as or different from the 3GPP network user identifier.

With reference to the fifth aspect, in a first possible implementation of the fifth aspect, the first message further includes type information, and the type information indicates a type of the tag device.

With reference to either the fifth aspect or the foregoing possible implementation of the fifth aspect, in a second possible implementation of the fifth aspect, the first message is a non-access stratum NAS registration request, and the NAS registration request includes the 3GPP network user identifier.

With reference to any one of the fifth aspect or the possible implementations of the fifth aspect, in a third possible implementation of the fifth aspect, the access network device obtains the identifier of the tag device through an inventory process or a tag access process, where the inventory process is a tag identifier obtaining process, and the tag access process is a process of performing a read operation or a write operation on the tag device.

With reference to any one of the fifth aspect or the possible implementations of the fifth aspect, in a fourth possible implementation of the fifth aspect, the communication unit is further configured to receive a second message from the access and mobility management network element, where the second message includes at least one of the following: a protocol parameter, a communication parameter, or an access parameter, where the protocol parameter indicates a communication protocol between the access network device and the tag device and/or a communication protocol between the access network device and a tag aggregation network element, the communication parameter is for supporting the access network device in configuring a data transmission rate and/or a decoding scheme used for communication with the tag device, and the access parameter is used by the access network device to configure a rule of a tag device access event, where the rule of the tag device access event includes at least one of the following: trigger time of the tag device access event, a periodicity of the tag device access event, or a quantity of tag devices corresponding to the tag device access event. The tag device access event is a read, write, kill, or inventory operation performed on a tag. The read operation may be reading information stored in the tag device, for example, sensor information. The inventory operation is a tag identifier obtaining operation. The tag device access may also be referred to as access of the tag device.

With reference to any one of the fifth aspect or the possible implementations of the fifth aspect, in a fifth possible implementation of the fifth aspect, the processing unit is specifically configured to: determine the communication protocol between the access network device and the tag device and/or the communication protocol between the access network device and the tag aggregation network element based on the second message; configure the data transmission rate and/or the decoding scheme used for communication with the tag device; and/or configure the rule of the tag device access event.

With reference to any one of the fifth aspect or the possible implementations of the fifth aspect, in a sixth possible implementation of the fifth aspect, the communication unit is further configured to receive an operation instruction from the tag aggregation network element, where the operation instruction indicates the access network device to perform a communication operation with the tag device; and the processing unit is further configured to perform the communication operation with the tag device according to the operation instruction. The tag aggregation network element may be an independent core network element, or a network element deployed together with a user plane function network element UPF, the access and mobility management network element AMF, a session management network element SMF, a network exposure function network element NEF, a server, or an internet of things platform.

With reference to any one of the fifth aspect or the possible implementations of the fifth aspect, in a seventh possible implementation of the fifth aspect, the identifier of the tag device includes a radio access control MAC address of the tag device, a secret identifier SID of the tag device, or an electronic product code EPC of the tag device.

With reference to any one of the fifth aspect or the possible implementations of the fifth aspect, in an eighth possible implementation of the fifth aspect, the processing unit includes a tag access function module and a tag agent function module, where the tag access function module is configured to obtain the identifier of the tag device, and the tag access function module sends the identifier of the tag device to the tag agent function module; and the tag agent function module is configured to determine the 3GPP network user identifier based on the identifier of the tag device.

With reference to any one of the fifth aspect or the possible implementations of the fifth aspect, in a ninth possible implementation of the fifth aspect, the tag agent function module is further configured to: generate first information, where the first information indicates a correspondence between the identifier of the tag device, an identifier of the tag access function module, and the 3GPP network user identifier; and address the tag access function module based on the first information.

With reference to any one of the fifth aspect or the possible implementations of the fifth aspect, in a tenth possible implementation of the fifth aspect, the 3GPP network user identifier includes a subscription concealed identifier SUCI or a subscription permanent identifier SUPI of the tag device.

It should be noted that the communication apparatus provided in the fifth aspect may also be a reader/writer device or a component in the reader/writer device. The reader/writer device may be deployed in an access network device or a terminal device. When the reader/writer device is deployed in the access network device, the communication apparatus may be the foregoing access network device or a component in the access network device. When the reader/writer device is deployed in the terminal device, the communication apparatus may be the terminal device or a component in the terminal device. Alternatively, the access network device may directly serve as the reader/writer device, or a terminal device may directly serve as the reader/writer device. When the access network device directly serves as the reader/writer device, the communication apparatus may be the foregoing access network device or a component in the access network device. When the terminal device directly serves as the reader/writer device, the communication apparatus may be the terminal device or a component in the terminal device.

According to a sixth aspect, a communication apparatus is provided. The apparatus may be an access and mobility management network element or a component in the access and mobility management network element. The apparatus includes: a processing unit, configured to receive, via a communication unit, a first message from an access network device, where the first message includes a 3rd generation partnership project 3GPP network user identifier of a tag device. The processing unit is further configured to send, via the communication unit to the mobility management network element, the 3GPP network user identifier to an authentication device, where the 3GPP network user identifier is for authenticating the tag device. The processing unit is further configured to: receive an authentication result of the tag device from the authentication device via the communication unit, and send the authentication result of the tag device to the access network device via the communication unit. The identifier of the tag device may be an identifier that is the same as or different from the 3GPP network user identifier.

With reference to the sixth aspect, in a first possible implementation of the sixth aspect, the first message further includes type information, and the type information indicates a type of the tag device.

With reference to either the sixth aspect or the foregoing possible implementation of the sixth aspect, in a second possible implementation of the sixth aspect, the first message is a non-access stratum NAS registration request, and the NAS registration request includes the 3GPP network user identifier.

With reference to any one of the sixth aspect or the possible implementations of the sixth aspect, in a third possible implementation of the sixth aspect, the processing unit is further configured to receive, via the communication unit, at least one of the following from a tag aggregation network element: a protocol parameter, a communication parameter, and an access parameter, where the protocol parameter indicates a communication protocol between the access network device and the tag device and/or a communication protocol between the access network device and the tag aggregation network element, the communication parameter is for supporting the access network device in configuring a data transmission rate and/or a decoding scheme used for communication with the tag device, and the access parameter is used by the access network device to configure a rule of a tag device access event, where the rule of the tag device access event includes at least one of the following: trigger time of the tag device access event, a periodicity of the tag device access event, or a quantity of tag devices corresponding to the tag device access event. The processing unit is further configured to send, via the communication unit, a second message to the access network device, where the second message includes at least one of the communication protocol parameter, the device running parameter, and the access parameter. The tag device access event is a read, write, kill, or inventory operation performed on a tag. The read operation may be reading information stored in the tag device, for example, sensor information. The inventory operation is a tag identifier obtaining operation. The tag device access may also be referred to as access of the tag device.

With reference to any one of the sixth aspect or the possible implementations of the sixth aspect, in a fourth possible implementation of the sixth aspect, the processor is further configured to receive, via the communication unit, a third message from the tag aggregation network element, where the third message is used by the tag aggregation network element to subscribe to a message related to the tag device from the access and mobility management network element. The tag aggregation network element may be an independent core network element, or a network element deployed together with a user plane function network element UPF, the access and mobility management network element AMF, a session management network element SMF, a network exposure function network element NEF, a server, or an internet of things platform.

With reference to any one of the sixth aspect or the possible implementations of the sixth aspect, in a fifth possible implementation of the sixth aspect, the third message includes a message type, and the message type indicates the message related to the tag device.

With reference to any one of the sixth aspect or the possible implementations of the sixth aspect, in a sixth possible implementation of the sixth aspect, the 3GPP network user identifier includes a subscription concealed identifier SUCI or a subscription permanent identifier SUPI of the tag device.

According to a seventh aspect, a communication apparatus is provided. The communication apparatus may be a tag aggregation network element or a component in the tag aggregation network element. The apparatus includes: a processing unit, configured to determine whether security authentication on a tag device succeeds; and a communication unit, configured to: after the processing unit determines that security authentication on the tag device succeeds, send an operation instruction to an access network device, where the operation instruction indicates the access network device to perform a communication operation with the tag device. The tag aggregation network element may be an independent core network element, or a network element deployed together with a user plane function network element UPF, the access and mobility management network element AMF, a session management network element SMF, a network exposure function network element NEF, a server, or an internet of things platform.

With reference to the seventh aspect, in a first possible implementation of the seventh aspect, the processing unit is specifically configured to: if a 3rd generation partnership project 3GPP network user identifier corresponding to an identifier of the tag device is obtained from an authentication device based on the identifier of the tag device, determine that security authentication on the tag device succeeds.

With reference to either the seventh aspect or the foregoing possible implementation of the seventh aspect, in a second possible implementation of the seventh aspect, the communication unit is further configured to send at least one of the following to an access and mobility management network element before the processing unit determines that security authentication on the tag device succeeds: a protocol parameter, a communication parameter, and an access parameter, where the protocol parameter indicates a communication protocol between the access network device and the tag device and/or a communication protocol between the access network device and a tag aggregation network element, the communication parameter is for supporting the access network device in configuring a data transmission rate and/or a decoding scheme used for communication with the tag device, and the access parameter is used by the access network device to configure a rule of a tag device access event, where the rule of the tag device access event includes at least one of the following: trigger time of the tag device access event, a periodicity of the tag device access event, or a quantity of tag devices corresponding to the tag device access event.

With reference to any one of the seventh aspect or the possible implementations of the seventh aspect, in a third possible implementation of the seventh aspect, the communication unit is further configured to send a third message to the access and mobility management network element, where the third message is for subscribing to a message related to the tag device from the access and mobility management network element.

With reference to any one of the seventh aspect or the possible implementations of the seventh aspect, in a fourth possible implementation of the seventh aspect, the third message includes a message type, and the message type indicates the message related to the tag device.

With reference to any one of the seventh aspect or the possible implementations of the seventh aspect, in a fifth possible implementation of the seventh aspect, the processing unit is specifically configured to: if no 3rd generation partnership project 3GPP network user identifier corresponding to an identifier of the tag device is obtained from an authentication device based on the identifier of the tag device, determine that security authentication on the tag device fails.

With reference to any one of the seventh aspect or the possible implementations of the seventh aspect, in a sixth possible implementation of the seventh aspect, the communication unit is further configured to send at least one of the following to an access and mobility management network element after the processing unit determines that security authentication on the tag device fails: a communication protocol parameter, a device running parameter, and an access parameter, where the communication protocol parameter indicates a communication protocol between the access network device and the tag device and/or a communication protocol between the access network device and a tag aggregation network element, the device running parameter is for supporting the access network device in configuring a function related to the tag device, and the access parameter is for supporting the access network device in configuring a rule for the tag device to access the access network device.

With reference to any one of the seventh aspect or the possible implementations of the seventh aspect, in a seventh possible implementation of the seventh aspect, the communication unit is further configured to send a third message to the access and mobility management network element, where the third message is for subscribing to a message related to the tag device from the access and mobility management network element.

With reference to any one of the seventh aspect or the possible implementations of the seventh aspect, in an eighth possible implementation of the seventh aspect, the third message includes a message type, and the message type indicates the message related to the tag device.

With reference to any one of the seventh aspect or the possible implementations of the seventh aspect, in a ninth possible implementation of the seventh aspect, the identifier of the tag device includes a radio access control MAC address of the tag device, a secret identifier SID of the tag device, or an electronic product code EPC of the tag device.

With reference to any one of the seventh aspect or the possible implementations of the seventh aspect, in a tenth possible implementation of the seventh aspect, the 3GPP network user identifier includes a subscription concealed identifier SUCI or a subscription permanent identifier SUPI of the tag device.

According to an eighth aspect, a communication apparatus is provided. The communication apparatus may be a tag device or a component in the tag device. The apparatus includes: a communication unit, configured to send a core network interaction message after receiving a tag trigger signal, where the core network interaction message is for message exchange between the tag device and a core network element.

With reference to the eighth aspect, in a first possible implementation of the eighth aspect, the core network interaction message may include any one of the following: a registration message, a deregistration message, a session establishment request message, a session modification request message, a session deletion request message, a service request message, or a tag data sending message. The registration message is for registering a tag with a core network, the deregistration message is for deregistering a tag from the core network, the session establishment request message is for establishing a session for a tag, the session modification request message is for modifying a session for a tag, the session deletion request message is for deleting a session for a tag, the service request message is for requesting a service for a tag, and the tag data sending message is for sending tag data. The tag data may be sensor data, preset data, or the like.

With reference to either the eighth aspect or the foregoing possible implementation of the eighth aspect, in a second possible implementation of the eighth aspect, the tag trigger signal is for triggering an inventory process, the tag trigger signal is for triggering a tag access process, the tag trigger signal is for triggering a tag authentication process, the tag trigger signal is for triggering a tag locking process, the tag trigger signal is for triggering a tag killing process, or the tag trigger signal is for tag device wakeup. The inventory process is a tag identifier obtaining process, the tag access process is a process of performing a read operation or a write operation on the tag device, the tag authentication process is a process of authenticating the tag device, the tag locking process is a process of locking the tag device, the tag killing process is a process of killing the tag device, and the tag device wakeup is a process of waking up the tag device.

With reference to any one of the eighth aspect or the possible implementations of the eighth aspect, in a third possible implementation of the eighth aspect, the communication unit is further configured to: receive filtering information, and send the core network interaction message if the filtering information is matched.

With reference to any one of the eighth aspect or the possible implementations of the eighth aspect, in a fourth possible implementation of the eighth aspect, the core network interaction message carries a tag identifier or a session identifier, and the tag identifier or the session identifier is obtained in the inventory process or the tag access process, where the inventory process is the tag identifier obtaining process, and the tag access process is the process of performing the read operation or the write operation on the tag device.

With reference to any one of the eighth aspect or the possible implementations of the eighth aspect, in a fifth possible implementation of the eighth aspect, the tag trigger signal is any one of the following: a select select command, a challenge challenge command, a query query command, a read read command, a write write command, a kill kill command, a lock lock command, and a wakeup command.

With reference to any one of the eighth aspect or the possible implementations of the eighth aspect, in a sixth possible implementation of the eighth aspect, the core network interaction message is a non-access stratum NAS message.

According to a ninth aspect, a communication apparatus is provided, and includes at least one processor and a memory, where the at least one processor is coupled to the memory, and the memory is configured to store a computer program.

The at least one processor is configured to execute the computer program stored in the memory, so that the apparatus performs the method according to any one of the first aspect or the implementations of the first aspect.

According to a tenth aspect, a communication apparatus is provided, and includes at least one processor and a memory, where the at least one processor is coupled to the memory, and the memory is configured to store a computer program.

The at least one processor is configured to execute the computer program stored in the memory, so that the apparatus performs the method according to any one of the second aspect or the implementations of the second aspect.

According to an eleventh aspect, a communication apparatus is provided, and includes at least one processor and a memory, where the at least one processor is coupled to the memory, and the memory is configured to store a computer program.

The at least one processor is configured to execute the computer program stored in the memory, so that the apparatus performs the method according to any one of the third aspect or the implementations of the third aspect.

According to twelfth aspect, a communication apparatus is provided, and includes at least one processor and a memory, where the at least one processor is coupled to the memory, and the memory is configured to store a computer program.

The at least one processor is configured to execute the computer program stored in the memory, so that the apparatus performs the method according to any one of the fourth aspect or the implementations of the fourth aspect.

According to a thirteenth aspect, a computer-readable storage medium is provided. The computer-readable storage medium stores instructions. When the computer-readable storage medium runs on the communication apparatus according to any one of the fifth aspect or the implementations of the fifth aspect, the communication apparatus is enabled to perform the authentication method according to any one of the first aspect or the implementations of the first aspect.

Alternatively, when the computer-readable storage medium runs on the communication apparatus according to any one of the sixth aspect or the implementations of the sixth aspect, the communication apparatus is enabled to perform the authentication method according to any one of the second aspect or the implementations of the second aspect.

Alternatively, when the computer-readable storage medium runs on the communication apparatus according to any one of the seventh aspect or the implementations of the seventh aspect, the communication apparatus is enabled to perform the authentication method according to any one of the third aspect or the implementations of the third aspect.

Alternatively, when the computer-readable storage medium runs on the communication apparatus according to any one of the eighth aspect or the implementations of the eighth aspect, the communication apparatus is enabled to perform the method according to any one of the fourth aspect or the implementations of the fourth aspect.

According to a fourteenth aspect, a wireless communication apparatus is provided. The communication apparatus includes a processor, for example, used in the communication apparatus, and is configured to implement the method according to any one of the first aspect or the implementations of the first aspect, the method according to any one of the second aspect or the implementations of the second aspect, the method according to any one of the third aspect or the implementations of the third aspect, or the method according to any one of the fourth aspect or the implementations of the fourth aspect. The communication apparatus may be, for example, a chip or a chip system. In a feasible implementation, the chip system further includes a memory. The memory is configured to store program instructions and data that are necessary for implementing functions of the method according to the first aspect, the second aspect, the third aspect, or the fourth aspect.

The chip system in the foregoing aspects may be a system-on-a-chip (system-on-a-chip, SOC), a baseband chip, or the like. The baseband chip may include a processor, a channel encoder, a digital signal processor, a modem, an interface module, and the like.

According to a fifteenth aspect, a communication system is provided. The communication system includes the access network device according to any one of the foregoing implementations, the tag aggregation network element according to any one of the foregoing implementations, the access and mobility management network element according to any one of the foregoing implementations, and the tag device according to any one of the foregoing implementations.

BRIEF DESCRIPTION OF THE DRAWINGS

FIG. 10A and FIG. 10B are a schematic flowchart of security authentication on a UWB tag according to an embodiment of this application;

DETAILED DESCRIPTION OF ILLUSTRATIVE EMBODIMENTS

Figure 1:
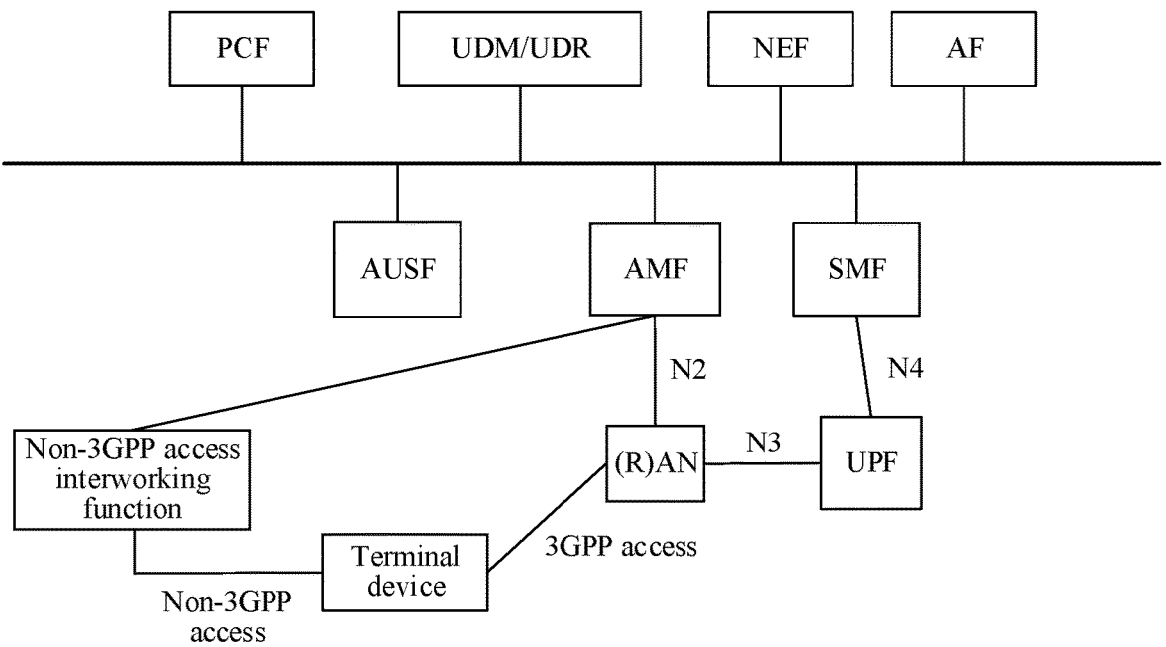
FIG. 1 is a diagram of an architecture of a communication system according to an embodiment of this application.

A 3rd generation partnership project (3GPP) communication system supports interconnection and interworking between a tag device and a 3GPP core network by using a non-3GPP technology. Refer to FIG. 1. A security network element is added relative to a 3GPP system architecture. Security authentication is performed on a tag device via the added security network element. After the authentication succeeds, the network element allows the tag device to interwork with a 3GPP core network by using a non-3GPP technology. The non-3GPP technology may be wireless fidelity (Wi-Fi), worldwide interoperability for microwave access (WiMAX), a code division multiple access (CDMA) network, or the like.

The architecture of the communication system shown in FIG. 1 mainly includes network functions and entities: a terminal device, an access network device, a user plane function network element, a data network, an access and mobility management function network element, a session management function network element, a policy control function network element, an application function network element, an authentication server function network element, and a unified database function network element. The figure shows an interaction relationship between the network function entities and corresponding interfaces. For example, UE (the terminal device) and an AMF (the access and mobility management function network element) may interact with each other through an N1 interface. Interaction between other network function entities is similar, and details are not described again.

The terminal device may access the 3GPP core network by using a 3GPP access technology or a non-3GPP access technology. In this scenario, the terminal device may be user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access the network. The terminal device and the access network device communicate with each other by using an air interface technology.

The access network (RAN) device is mainly responsible for functions such as radio resource management, quality of service (QoS) management, and data compression and encryption on an air interface side. The access network device may include base stations in various forms, such as a macro base station, a micro base station (also referred to as a small cell), a relay station, and an access point. In systems using different radio access technologies, a device having a function of a base station may be named differently. For example, the device is referred to as a gNB in a 5th generation (5G) system, referred to as an evolved NodeB (eNB or eNodeB) in an LTE system, and referred to as a NodeB in a 3rd generation (3G) system.

The access and mobility management function (AMF) network element is a core network element, and is mainly responsible for signaling processing, for example, functions such as access control, mobility management, attachment and detachment, and gateway selection. When serving a session in the terminal device, the AMF network element provides a control-plane storage resource for the session, and stores a session identifier, an SMF network element identifier associated with the session identifier, and the like.

Non-3GPP access interworking function: The network element allows the terminal device to interconnect and interwork with the 3GPP core network by using a non-3GPP technology, where the non-3GPP technology is, for example, wireless fidelity (Wi-Fi), worldwide interoperability for microwave access (WiMAX), and a code division multiple access (CDMA) network. The non-3GPP access interworking function may be for directly accessing the 3GPP core network compared with a trusted non-3GPP access network device. The network element needs to interconnect and interwork with the 3GPP core network through a security tunnel established by a security gateway, for example, an evolved packet data gateway (ePDG), a trusted non-3GPP gateway function (TNGF), or a non-3GPP interworking function (N3IWF).

The session management function (SMF) network element is responsible for user plane network element selection, user plane network element redirection, internet protocol (IP) address assignment, bearer establishment, modification, and release, and QoS control.

The user plane function (UPF) network element is responsible for forwarding and receiving user data in the terminal device. The UPF network element may receive user data from a data network, and transmit the user data to the terminal device via the access network device. The UPF network element may further receive user data from the terminal device via the access network device, and forward the user data to the data network. A transmission resource and a scheduling function that are used by the UPF network element to serve the terminal device are managed and controlled by the SMF network element.

The policy control function (PCF) network element mainly supports providing of a unified policy framework to control network behavior and providing of a policy rule for a control layer network function, and is responsible for obtaining policy-related user subscription information.

The authentication server function (AUSF) network element mainly provides an authentication function, and supports authentication of 3GPP access and non-3GPP access. For details, refer to 3GPP TS 33.501.

A network exposure function (NEF) network element mainly supports secure interaction between a 3GPP network and a third-party application. The NEF can securely expose a network capability and an event to a third party, to enhance or improve application service quality. The 3GPP network may also securely obtain related data from the third party, to enhance intelligent decision of the network. In addition, the network element supports restoration of structured data from a unified database or storage of structured data in a unified database.

A unified data repository (UDR) network element/unified data management (UDM) network element is mainly responsible for storing structured data, where the stored content includes subscription data and policy data, externally exposed structured data, and application-related data.

The application function (AF) network element mainly supports interacting with the 3GPP core network to provide a service, for example, affect a data routing decision, provide a policy control function, or provide some third-party services for a network side.

It should be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be implemented by a plurality of devices, or may be one functional module in one device. This is not specifically limited in embodiments of this application. Although not shown, the system shown in FIG. 1 may further include another function network element. This is not limited in this embodiment of this application.

The Following Describes Two Types of Tag Devices with Reference to the Accompanying Drawings: an RFID Tag and a UWB Tag.

Figure 2:
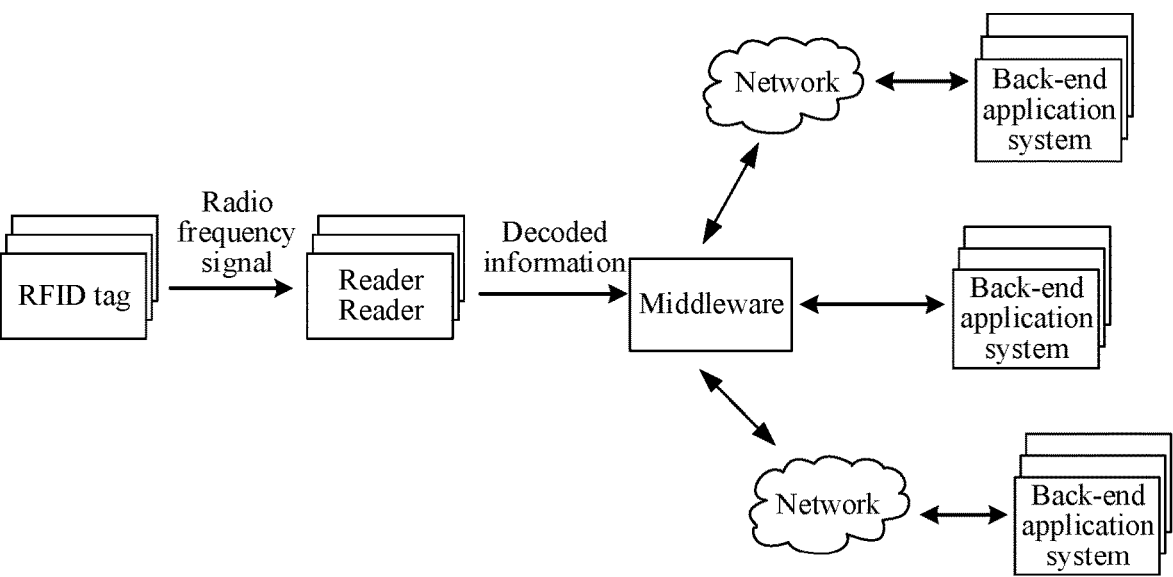
FIG. 2 is a diagram of an architecture of an RFID system according to an embodiment of this application.

(1) The RFID tag may also be referred to as an inductive electronic chip, a proximity card, an inductive card, a contactless card, an electronic tag, an electronic barcode, or the like. Refer to FIG. 2. An RFID system mainly includes an RFID tag, a reader, middleware, and other backend application systems. After entering the magnetic field, the RFID tag receives a radio frequency signal sent by the reader. The RFID tag sends product information in a chip of the RFID tag. After reading and decoding the information, the reader sends the information to a central information system or a background application system for data processing. This type of RFID tag may be referred to as a passive tag.

Alternatively, the RFID tag actively sends a signal of a specific frequency. After reading and decoding the signal, the reader sends the signal to a central information system or a background application system for data processing. This type of RFID tag is referred to as an active tag (active tag).

Figure 3:
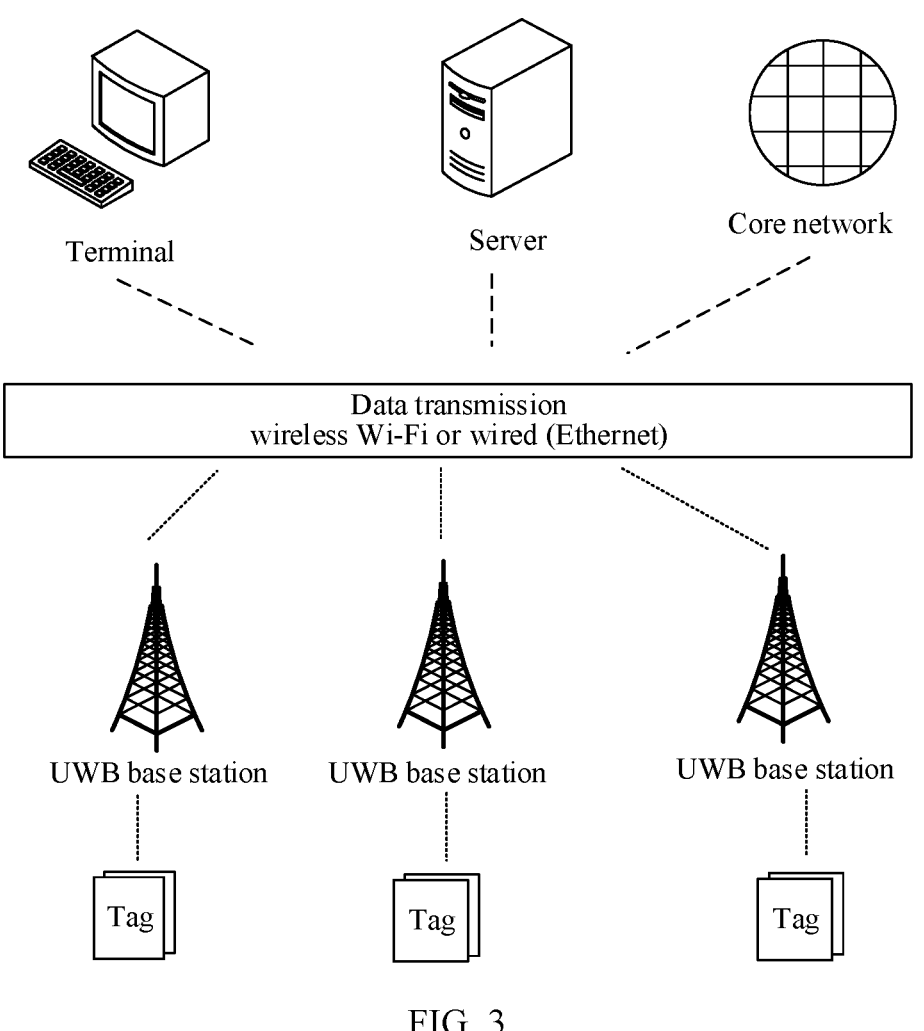
FIG. 3 is a diagram of an architecture of a UWB system according to an embodiment of this application.

(2) Refer to FIG. 3. A UWB system mainly includes a UWB tag (or a UWB terminal), a UWB base station, and a positioning server. The UWB tag may be referred to as a tag, and the UWB base station may be referred to as a reader. UWB is a carrierless communication technology that uses nanoseconds to microseconds non-sine narrow pulses to transmit data. A signal with extremely low power may be transmitted over a wide spectrum. For example, a data transmission rate of hundreds of Mbit/s to several Gbit/s may be achieved between the UWB base station and the UWB tag in a range of about 10 meters.

Figure 4:
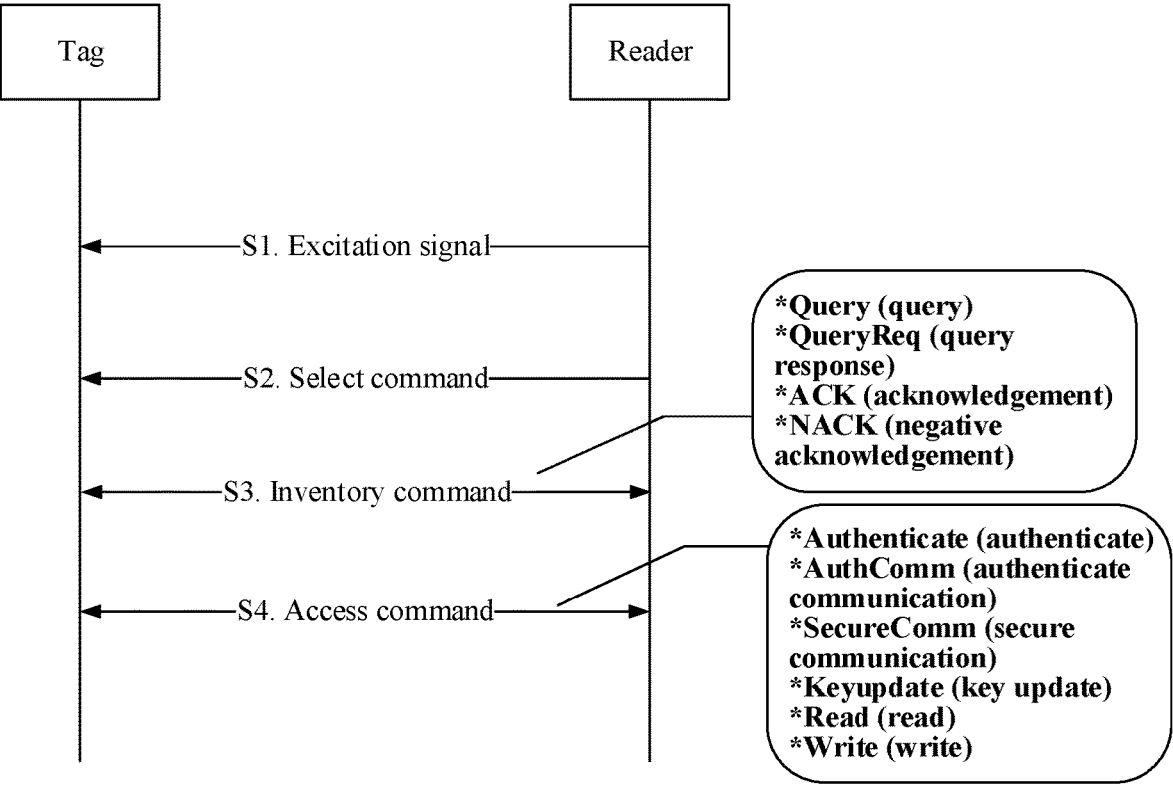
FIG. 4 is a schematic flowchart of interaction between a tag and a reader according to an embodiment of this application.

FIG. 4 is a schematic flowchart of interaction between a tag and a reader, where the interaction specifically includes the following steps.

S1. The reader first sends an excitation signal to the RFID tag, so that the tag obtains energy.

S2. The reader selects, according to a select command, a tag that meets a condition.

S3. The tag and the reader negotiate a communication parameter of current communication (inventory) according to inventory series commands.

The inventory series commands include Query, QueryRep (query response), acknowledgement (ACK), negative acknowledgement (NACK), and the like. The communication parameter may be a data transmission rate, a coding scheme, or the like.

S4. The tag and the reader perform security authentication and specific read and write operations according to access series commands.

The access series commands include an Authenticate command, an AuthComm command, a SecureComm command, a KeyUpdate command, a Read command, a Write command, and the like. Specifically, Authenticate is for bidirectional authentication between the tag and the reader. After the security authentication process is completed, specific read and write operations are performed according to instructions such as KeyUpdate, Read, and Write.

To implement unified network management on a plurality of types of tags, the reader may be integrated on a network side, so that a function module or network element that is integrated on the network side and has a same function as the reader communicates and interact with a tag device. In a possible implementation, a tag access function module and a tag convergence function module are deployed on an access network device, and a tag aggregation function module (or a tag aggregation network element) is deployed on a core network side. The tag access function module is responsible for interacting with the tag device. The tag agent function module is configured to establish a non-access stratum (NAS) connection of a device granularity for the tag device, to transfer relevant authentication information by using a NAS message in a subsequent security authentication process.

Alternatively, the reader may be deployed in a terminal device. In this embodiment of this application, an example in which the reader is deployed in the access network device is used for description. It should be understood that when the reader is deployed in the terminal device, the terminal device may perform a function performed by the access network device in this embodiment of this application. The reader may be referred to as a reader/writer, or may be referred to as a reader/writer device.

Alternatively, the access network device may directly serve as the reader/writer device, or the terminal device may directly serve as the reader/writer device.

Figure 5:
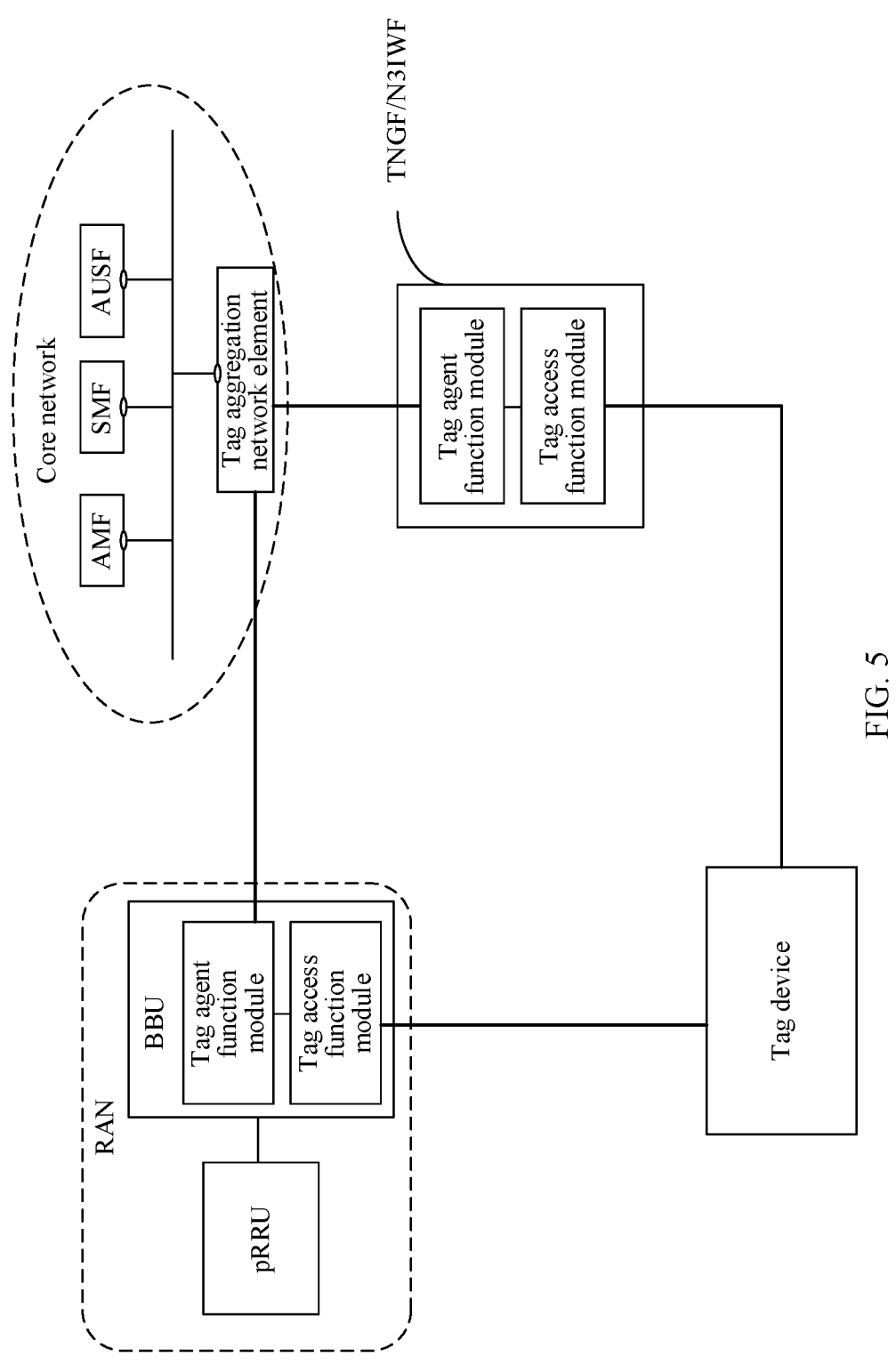
FIG. 5 is a diagram of an architecture of another communication system according to an embodiment of this application.

FIG. 5 is a diagram of an architecture of another communication system according to an embodiment of this application. A tag device may access a core network by using a 3GPP access technology. For example, the tag device accesses the core network through a RAN, and the RAN includes a tag access function module and a tag agent function module. The tag device may alternatively access a core network by using a non-3GPP access technology. For example, in the architecture shown in FIG. 5, the tag device may access the core network through a N3IWF or a TNGF by using the non-3GPP access technology. The N3IWF or the TNGF may also include a tag access function module and a tag agent function module. For example, when the core network is accessed through the N3IWF network element, a secure tunnel may be established; and when the core network is accessed through the TNGF network element, a secure tunnel may not be established. The non-3GPP technology may be a wireless fidelity (Wi-Fi) technology, a worldwide interoperability for microwave access (WiMAX) technology, a code division multiple access (CDMA) network technology, or the like.

It should be noted that, the tag access function module may communicate with the tag device, and may further communicate with the tag agent function module; and the tag agent function module may communicate with a tag aggregation network element (which may also be referred to as a tag aggregation function module).

In FIG. 5, an example in which a RAN node includes a pico radio remote unit (pRRU) and a baseband unit (BBU) is used. For example, a radio frequency module of an RFID reader is co-deployed with the pRRU, or is directly integrated into the pRRU. Upper-layer function modules RFID-L and RFID-H of the RFID reader are deployed in the BBU and the core network respectively. A radio frequency module of a UWB base station is co-deployed with the pRRU, or is directly integrated into the pRRU. Upper-layer function modules UWB-L and UWB-H of the UWB base station are deployed in the BBU and the core network respectively. The RFID-L and the UWB-L may be referred to as tag access function modules, and the RFID-H and the UWB-H may be referred to as tag aggregation network elements. In addition, the tag agent function module may be referred to as a uni-AGF. Specific functions of the modules are described as follows:

(1) The RFID-L includes a media access control (MAC) protocol layer, responsible for interacting with an RFID tag. The RFID-L may further include a low level reader protocol (LLRP) protocol layer, responsible for receiving a higher-layer command of the RFID-H and converting the command into a corresponding air interface operation.

(2) The RFID-H includes a protocol adaptation layer (protocol adaptation layer, PAL), which is responsible for interacting with the RFID-L and may specifically use an LLRP protocol. The RFID-H may further include an application level events (ALE) protocol layer, responsible for receiving a service invocation of a back-end server, converting the service invocation into a specific higher-layer command, and sending the command to the RFID-L through the LLRP protocol.

(3) The UWB-L includes a MAC protocol layer, responsible for interacting with a UWB tag. The UWB-L may further include a PAL protocol layer, responsible for receiving a higher-layer command of the UWB-H and converting the command into a corresponding air interface operation.

(4) The UWB-H includes a PAL protocol layer, responsible for interacting with the UWB-L. The UWB-H is further responsible for higher-layer functions such as network configuration and message routing.

It should be noted that, because the UWB/RFID tag does not have a complete UE protocol stack, the BBU uses a unified access gateway function (Uni-AGF) module to establish a NAS connection of a tag granularity for a tag device. A UWB application server or an RFID application server is deployed in an enterprise data center or on a private cloud.

The foregoing uses only the RFID and the UWB as an example to describe deployment of each function module. The architecture shown in FIG. 5 is applicable to converged management of another tag device. This is not limited in embodiments of this application. The RFID-L and the UWB-L may be considered as tag access function modules in embodiments of this application, the RFID-H and the UWB-H may be considered as tag aggregation network elements (or referred to as tag aggregation function modules) in embodiments of this application; and the Uni-AGF may be considered as the tag agent function module in embodiments of this application.

Figure 6:
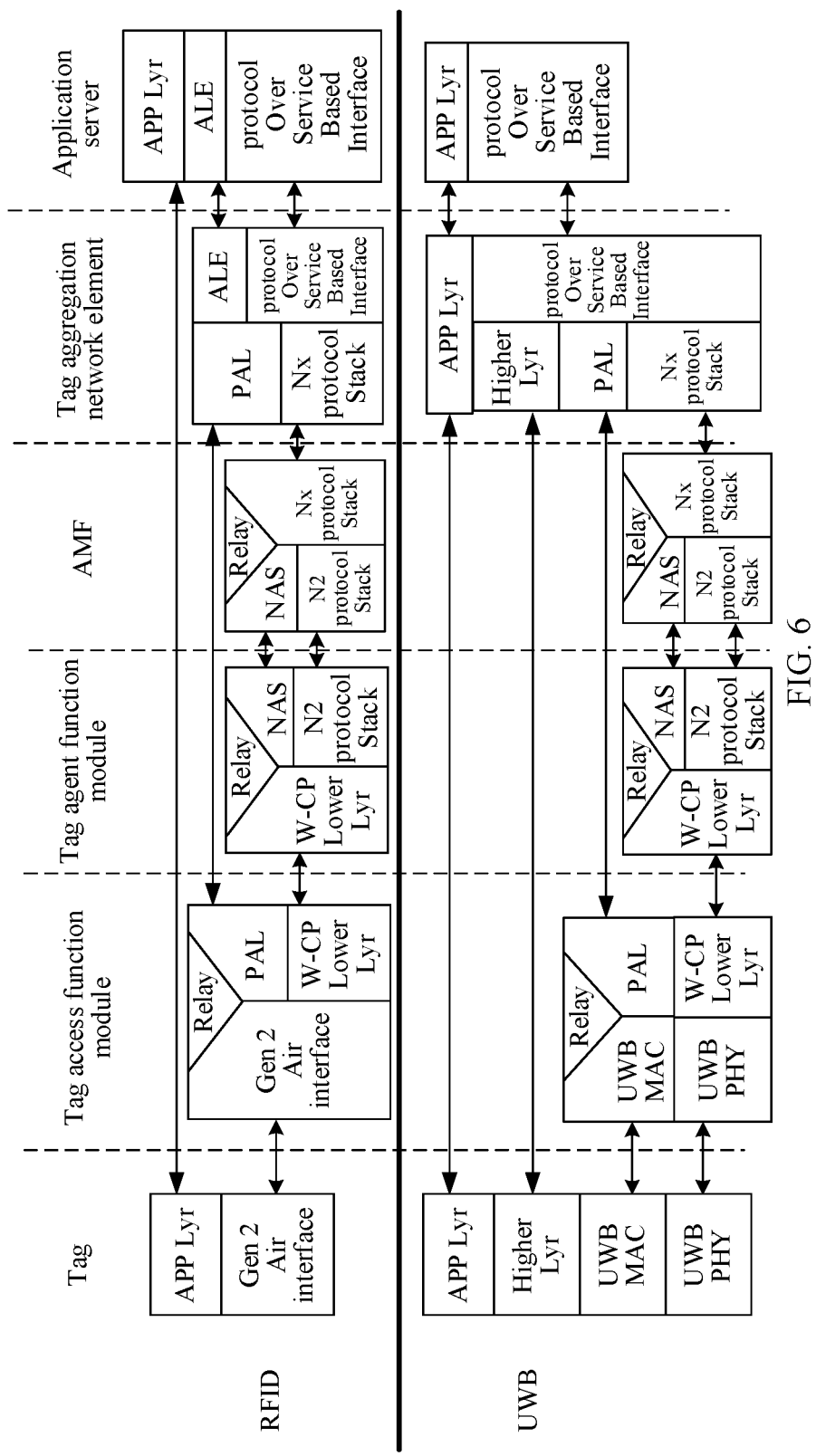
FIG. 6 is a schematic diagram of a protocol stack to which a communication system is applicable according to an embodiment of this application.

FIG. 6 is a protocol stack applicable to the communication system shown in FIG. 5. The Uni-AGF is responsible for establishing a NAS connection for each tag device (for example, the RFID tag or the UWB tag), and an established control plane channel is "Tag↔RFID-L↔Uni-AGF↔AMF" or "Tag↔UWB-L↔Uni-AGF↔AMF". In addition, when the RFID-H and the RFID-L (or the UWB-H and the UWB-L) perform device-level communication, if basic device configuration is completed, the Uni-AGF may be skipped. FIG. 6 uses the RFID tag and the UWB tag as an example to describe a protocol stack for communication among a tag (tag) device, a tag access function module, a tag agent function module, an AMF, a tag aggregation network element, and an application server. In an RFID, the tag device is the RFID tag, the tag access function module is the RFID-L, the tag agent function module is the Uni-AGF, and the tag aggregation network element is the RFID-H. In a UWB, the tag device is the UWB tag, the tag access function module is the UWB-L, the tag agent function module is the Uni-AGF, and the tag aggregation network element is the UWB-H.

It should be noted that the RFID-H may be independently deployed, or integrated into another core network element. When the RFID-H is integrated into the AMF, message exchange between the RFID-H and the AMF may be performed through an internal interface. The UWB-H may be independently deployed, or integrated into another core network element. When the UWB-H is integrated into the AMF, message exchange between the UWB-H and the AMF may be performed through an internal interface.

At present, there is no unified authentication process for security authentication on tag devices in convergence scenarios. Security authentication procedures of tag devices vary greatly from vendor to vendor. This greatly increases complexity of converged management. This embodiment of this application provides the authentication method. The access network device may obtain the identifier of the tag device, determine the 3rd generation partnership project 3GPP network user identifier based on the identifier of the tag device, and send the first message to the access and mobility management network element, where the first message includes the 3GPP network user identifier for authenticating the tag device. The authentication method provided in this embodiment of this application can implement authentication on different tag devices, to support unified network management for a plurality of tags, and provide a unified authentication procedure to perform security authentication on a tag device, thereby reducing complexity of converged management.

Figure 7A:
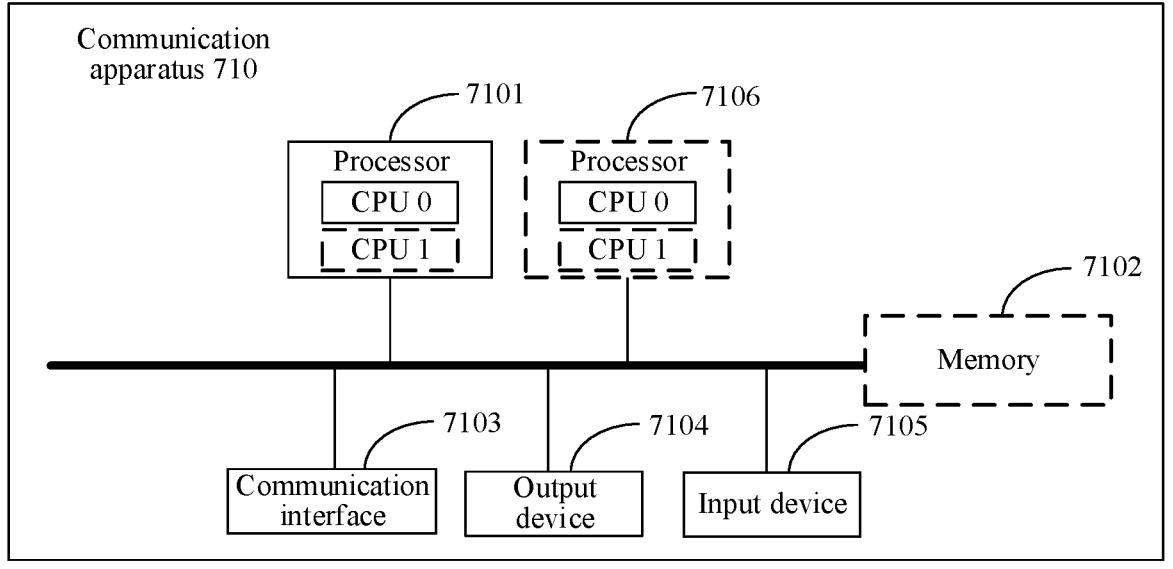
FIG. 7a is a block diagram of a structure of a communication apparatus according to an embodiment of this application.

The network element in embodiments of this application may be implemented by a communication apparatus 710 in FIG. 7a. FIG. 7a is a schematic diagram of a hardware structure of the communication apparatus 710 according to an embodiment of this application. The communication apparatus 710 includes a processor 7101 and at least one communication interface (where in FIG. 7a, an example in which a communication interface 7103 is included is merely used for description), and optionally, further includes a memory 7102. The processor 7101, the memory 7102, and the communication interface 7103 are connected to each other.

The processor 7101 may be a general-purpose central processing unit (CPU), a microprocessor, an application-specific integrated circuit (ASIC), or one or more integrated circuits configured to control program execution in the solutions of this application.

The communication interface 7103 that uses any apparatus such as a transceiver is configured to communicate with another device or a communication network, for example, Ethernet, a radio access network (RAN), or a wireless local area network (WLAN).

The memory 7102 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in a form of instructions or a data structure and that can be accessed by a computer. However, this is not limited herein. The memory may exist independently, or may be connected to the processor. The memory may alternatively be integrated with the processor.

The memory 7102 is configured to store computer-executable instructions for executing the solutions of this application, and the processor 7101 controls the execution. The processor 7101 is configured to execute the computer-executable instructions stored in the memory 7102, to implement the intent processing method provided in the following embodiments of this application.

Optionally, the computer-executable instructions in this embodiment of this application may also be referred to as application program code. This is not specifically limited in this embodiment of this application.

During specific implementation, in an embodiment, the processor 7101 may include one or more CPUs, for example, a CPU 0 and a CPU 1 in FIG. 7a.

During specific implementation, in an embodiment, the communication apparatus 710 may include a plurality of processors, for example, the processor 7101 and a processor 7106 in FIG. 7a. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 710 may further include an output device 7104 and an input device 7105. The output device 7104 communicates with the processor 7101, and may display information in a plurality of manners. For example, the output device 7104 may be a liquid crystal display (LCD), a light emitting diode (LED) display device, a cathode ray tube (CRT) display device, or a projector. The input device 7105 communicates with the processor 7101, and may receive an input from a user in a plurality of manners. For example, the input device 7105 may be a mouse, a keyboard, a touchscreen device, or a sensing device.

The communication apparatus 710 may be a general-purpose device or a dedicated device. During specific implementation, the communication apparatus 710 may be a desktop computer, a portable computer, a network server, a palmtop computer (PDA), a mobile phone, a tablet computer, a wireless terminal apparatus, an embedded device, or a device having a structure similar to that in FIG. 7a. A type of the communication apparatus 710 is not limited in this embodiment of this application.

It should be noted that the communication apparatus 710 may be an entire terminal, may be a part or component that implements a function of the terminal, or may be a communication chip, for example, a baseband chip. When the communication apparatus 710 is an entire terminal, the communication interface may be a radio frequency module. When the communication apparatus 710 is a communication chip, the communication interface 7103 may be an input/output interface circuit of the chip, where the input/output interface circuit is configured to read and output a baseband signal.

Figure 7B:
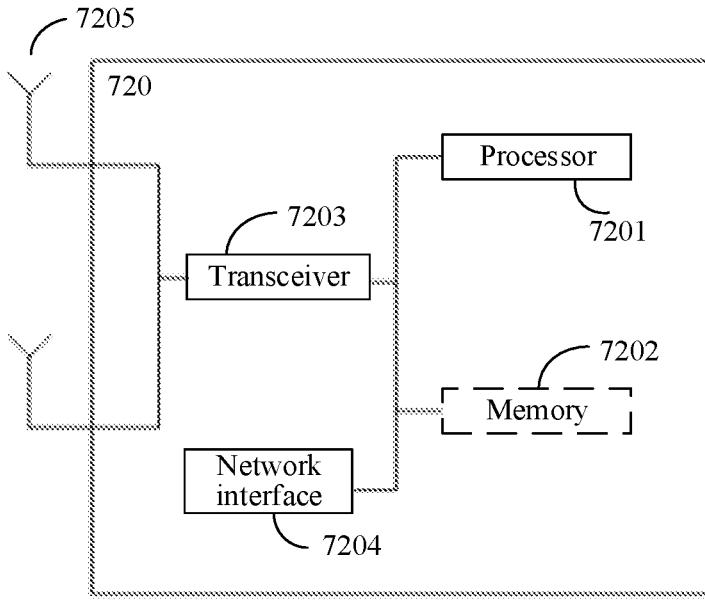
FIG. 7b is another block diagram of a structure of a communication apparatus according to an embodiment of this application.

The network element in embodiments of this application may alternatively be implemented by a communication apparatus shown in FIG. 7b. Refer to FIG. 7b. The communication apparatus includes at least one processor 7201, at least one transceiver 7203, at least one network interface 7204, and one or more antennas 7205. Optionally, the communication apparatus further includes at least one memory 7202. The processor 7201, the memory 7202, the transceiver 7203, and the network interface 7204 are connected, for example, through a bus. The antenna 7205 is connected to the transceiver 7203. The network interface 7204 is configured to enable the communication apparatus to connect to another communication apparatus through a communication link. For example, the communication apparatus is connected to a core network element through an S1 interface. In this embodiment of this application, the connection may include various types of interfaces, transmission lines, buses, or the like. This is not limited in this embodiment.

In this embodiment of this application, the processor, for example, the processor 7201, may include at least one of the following types: a general-purpose central processing unit (CPU), a digital signal processor (DSP), a microprocessor, an application-specific integrated circuit (ASIC), a microcontroller (MCU), a field programmable gate array (FPGA), or an integrated circuit configured to implement a logical operation. For example, the processor 7201 may be a single-core (single-CPU) processor or a multi-core (multi-CPU) processor. The at least one processor 7201 may be integrated into one chip or located on a plurality of different chips.

The memory in this embodiment of this application, for example, the memory 7202, may include at least one of the following types: a read-only memory (ROM) or another type of static storage device that can store static information and instructions, a random access memory (RAM) or another type of dynamic storage device that can store information and instructions, or an EEPROM. In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto.

The memory 7202 may exist independently, or may be connected to the processor 7201. Optionally, the memory

7202 may alternatively be integrated with the processor 7201, for example, integrated into one chip. The memory 7202 can store program code for performing the technical solutions in embodiments of this application, and the processor 7201 controls execution of the program code. Various types of executed computer program code may also be considered as drivers of the processor 7201. For example, the processor 7201 is configured to execute the computer program code stored in the memory 7202, to implement the technical solutions in embodiments of this application.

The transceiver 7203 may be configured to support receiving or sending of a radio frequency signal between the communication apparatus and another network element, and the transceiver 7203 may be connected to the antenna 7205. Specifically, the one or more antennas 7205 may receive a radio frequency signal. The transceiver 7203 may be configured to: receive the radio frequency signal from the antenna, convert the radio frequency signal into a digital baseband signal or a digital intermediate frequency signal, and provide the digital baseband signal or the digital intermediate frequency signal for the processor 7201, so that the processor 7201 further processes the digital baseband signal or the digital intermediate frequency signal, for example, performs demodulation processing and decoding processing. In addition, the transceiver 7203 may be configured to: receive a modulated digital baseband signal or digital intermediate frequency signal from the processor 7201, convert the modulated digital baseband signal or digital intermediate frequency signal into a radio frequency signal, and send the radio frequency signal through the one or more antennas 7205. Specifically, the transceiver 7203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 7203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. The transceiver may be referred to as a transceiver circuit, a transceiver unit, a transceiver component, a sending circuit, a sending unit, a sending component, or the like.

It should be noted that the communication apparatus 720 may be an entire communication apparatus, may be a part or component that implements a function of the communication apparatus, or may be a communication chip. When the communication apparatus 720 is a communication chip, the transceiver 7203 may be an interface circuit of the chip, where the interface circuit is configured to read and output a baseband signal.

Figure 8A:
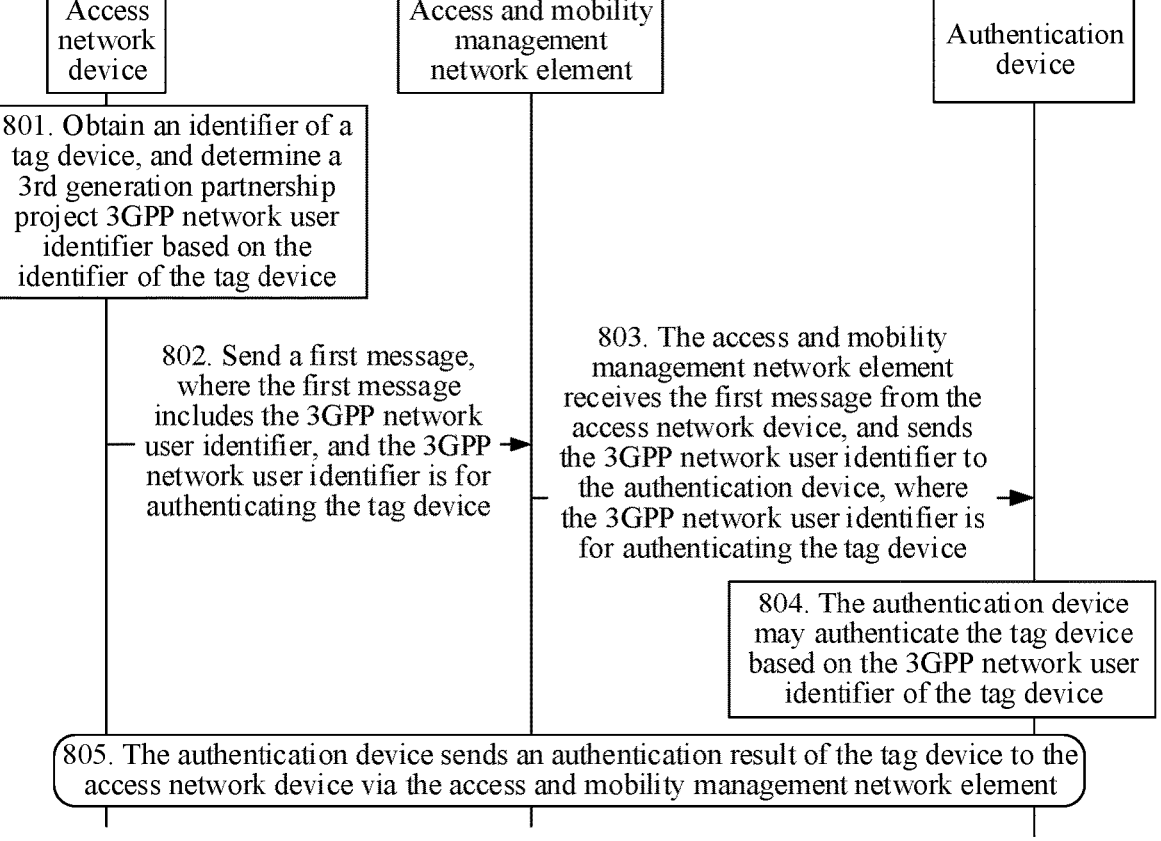
FIG. 8a is a schematic flowchart of an authentication method according to an embodiment of this application.

An embodiment of this application provides an authentication method. As shown in FIG. 8a, the method includes the following steps.

801. An access network device obtains an identifier of a tag device, and determines a 3rd generation partnership project 3GPP network user identifier based on the identifier of the tag device.

The tag device is a new type of terminal device, and the tag device may access the access network device in a wireless manner. For example, the tag device may access the access network device by using a non-3GPP technology such as Wi-Fi, WiMAX, a CDMA network, or EPC Gen2 ultra-high frequency (UHF); the tag device accesses the access network device by simulating a non-3GPP access technology link through an NR air interface between the tag device and the access network device; or the tag device accesses the access network device through an NR air interface. It should be noted that the tag device is not limited to a tag, and may be a terminal device of any form.

For example, the access network device sends a message to the tag device, to request the tag device to send the identifier of the tag device. Alternatively, the access network device receives the identifier actively reported by the tag device.

The identifier of the tag device may be an identifier that is the same as the 3GPP network user identifier, or may be an identifier that is different from the 3GPP network user identifier.

For example, the identifier of the tag device is an identifier different from the 3GPP network user identifier. The identifier of the tag device includes a MAC address of the tag device, a secret identifier (SID) of the tag device, or an electronic product code (EPC) of the tag device. For example, when the tag device is an RFID tag, the identifier of the tag device may be a SID or an EPC; and when the tag device is a UWB tag, the identifier of the tag device may be a MAC address.

In a possible implementation, the 3GPP network user identifier of the tag device includes a subscription concealed identifier (SUCI) of the tag device. The access network device may determine the SUCI based on the identifier of the tag device, or determine a subscription permanent identifier (SUPI) based on the identifier of the tag device, determine the SUCI based on the SUPI. Subsequently, security authentication is performed on the tag device by using the SUCI.

In another possible implementation, the 3GPP network user identifier of the tag device includes an SUPI. For example, the access network device determines the SUPI based on the identifier of the tag device, and may subsequently report the SUPI to an access and mobility management network element, to perform security authentication on the tag device based on the SUPI. In this implementation, the 3GPP network user identifier of the tag device may be the SUPI.

For example, the identifier of the tag device is an identifier that is the same as the 3GPP network user identifier, and the identifier of the tag device may include the SUCI or the SUPI.

For example, the access network device may obtain the identifier of the tag device through an inventory process or a tag access process.

The inventory process may be a tag identifier obtaining process, and the tag access process may be a process of performing a read operation or a write operation on the tag device.

In a specific implementation, the access network device may include a tag access function module and a tag agent function module.

The tag access function module may obtain the identifier of the tag device, and send the identifier of the tag device to the tag agent function module. The tag agent function module determines the 3GPP network user identifier based on the identifier of the tag device.

802. The access network device sends a first message to the access and mobility management network element, where the first message includes the 3GPP network user identifier, and the 3GPP network user identifier is for authenticating the tag device.

The access and mobility management network element may be the access and mobility management function described above, for example, may be the AMF described above. After determining the 3GPP network user identifier based on the identifier of the tag device, the access network device sends the 3GPP network user identifier of the tag device to the access and mobility management network element by using the first message, to perform security authentication on the tag device.

For example, the first message is for requesting to establish a NAS connection for the tag device. Subsequently, information, for example, the 3GPP network user identifier of the tag device, related to security authentication on the tag device is transmitted by using a NAS message. In a possible implementation, the first message is an initial UE message (initial UE message).

In a possible implementation, the first message further includes type information, and the type information indicates a type of the tag device. For example, the first message includes an "RFID indicator", to indicate a core network to establish a NAS connection for an RFID tag.

In a possible implementation, in a scenario in which the access network device includes the tag access function module and the tag agent function module, the tag agent function module sends the first message to the access and mobility management network element after determining the 3GPP network user identifier of the tag device.

803. The access and mobility management network element receives the first message from the access network device, and sends the 3GPP network user identifier to an authentication device, where the 3GPP network user identifier is for authenticating the tag device.

For example, the access and mobility management network element obtains the 3GPP network user identifier of the tag device from the first message, and selects the authentication device to perform security authentication on the tag device. For example, the access and mobility management network element sends the 3GPP network user identifier of the tag device to the authentication device, so that the authentication device authenticates the tag device based on the 3GPP network user identifier of the tag device.

804. The authentication device may authenticate the tag device based on the 3GPP network user identifier of the tag device.

After the access and mobility management network element selects the authentication device, a path "tag device↔access network device↔access and mobility management network element↔authentication device" is established. Subsequently, exchange of authentication-related signaling may be completed through the foregoing channel, to implement security authentication on the tag device. The authentication device may be the AUSF or the UDM described above. The authentication device may authenticate the tag device based on the 3GPP network user identifier of the tag device. After the authentication succeeds, the authentication device may further store the 3GPP network user identifier of the tag device. In a possible implementation, the authentication device includes an AUSF and a UDM. The AUSF and the UDM cooperate to authenticate the tag device. Alternatively, the authentication device includes an AUSF and a third-party authentication, authorization, and accounting (authentication, authorization, and accounting, AAA) server, and the AUSF and the AAA server cooperate to authenticate the tag device.

In a possible implementation, the authentication device may further obtain the type information of the tag device from the first message, and may select, based on the type information of the tag device, an authentication method that matches the tag device to perform security authentication on the tag device.

For example, if the type information included in the first message is "RFID indicator", the authentication device may select an RFID-standardization or vendor-defined authentication method.

805. The authentication device sends an authentication result of the tag device to the access network device via the access and mobility management network element. Correspondingly, the access network device receives the authentication result of the tag device via the access and mobility management network element.

The authentication result indicates whether the security authentication on the tag device succeeds. The authentication result may also be referred to as a security authentication result, an authentication result, or the like. This is not limited in this embodiment of this application.

It should be noted that, steps 801 to 805 provide a unified authentication procedure to perform security authentication on different labels. Before performing security authentication, a network side may further configure a parameter related to the tag device for the access network device. For example, a tag aggregation network element deployed on the network side sends the parameter related to the tag device to the access and mobility management network element, where the parameter related to the tag device specifically includes at least one of the following: a protocol parameter, a communication parameter, or an access parameter.

The protocol parameter indicates a communication protocol between the access network device and the tag device and/or a communication protocol between the access network device and the tag aggregation network element. For example, the protocol parameter may include protocol version information, for example, may be a protocol version supported by the tag aggregation network element.

The communication parameter is for supporting the access network device in configuring a data transmission rate and/or a decoding scheme used for communication with the tag device. It may be understood that, the communication parameter indicates the access network device to configure a running parameter related to the tag device, to support communication between the access network device and the tag device and between the access network device and the tag aggregation network element.

The access parameter is used by the access network device to configure a rule of a tag device access event, where the rule of the tag device access event includes at least one of the following: trigger time of the tag device access event, a periodicity of the tag device access event, or a quantity of tag devices corresponding to the tag device access event.

The tag device access event may be a read, write, kill, or inventory operation performed on a tag.

The read operation may be reading information stored in the tag device, for example, sensor information. The kill operation is an operation of setting a tag to be temporarily unavailable or permanently unavailable. The inventory operation is a tag identifier obtaining operation. The tag device access may also be referred to as access of the tag device.

After receiving the parameter related to the tag device from the tag aggregation network element, the access and mobility management network element encapsulates a second message based on the received parameter, and sends the second message to the access network device.

After receiving the second message from the access and mobility management network element, the access network device may further complete local configuration based on the parameter in the second message. For example, the access network device determines the communication protocol between the access network device and the tag device and/or the communication protocol between the access network device and the tag aggregation network element based on the protocol parameter in the second message.

The access network device may further configure, based on the communication parameter in the second message, the data transmission rate and/or the decoding scheme used for communication with the tag device.

The access network device may further configure the rule of the tag device access event based on the access parameter in the second message.

It should be noted that, in a scenario in which the access network device includes the tag access function module and the tag agent function module, the tag access function module receives the second message from the access and mobility management network element, and completes configuration based on the parameter in the second message.

In a possible implementation, before the network side configures the parameter related to the tag device for the access network device, the tag aggregation network element may further subscribe to a message related to the tag device from the access and mobility management network element. After receiving a message sent by another network element, the access and mobility management network element may route the message related to the tag device to the tag aggregation network element based on subscription of the tag aggregation network element, or route a message related to one or more types of tag devices to the tag aggregation network element.

In the method shown in FIG. 8a, the access network device may determine the 3GPP network user identifier of the tag device after obtaining information about the tag device, and may further send the 3GPP network user identifier of the tag device to the access and mobility management network element, so that the access and mobility management network element sends the 3GPP network user identifier of the tag device to the authentication device to authenticate the tag device. Different tag devices may be authenticated by using a unified authentication procedure, to support unified network management for a plurality of tags, and provide a unified authentication procedure to perform security authentication on a tag device, thereby reducing complexity of converged management.

Figure 8B:
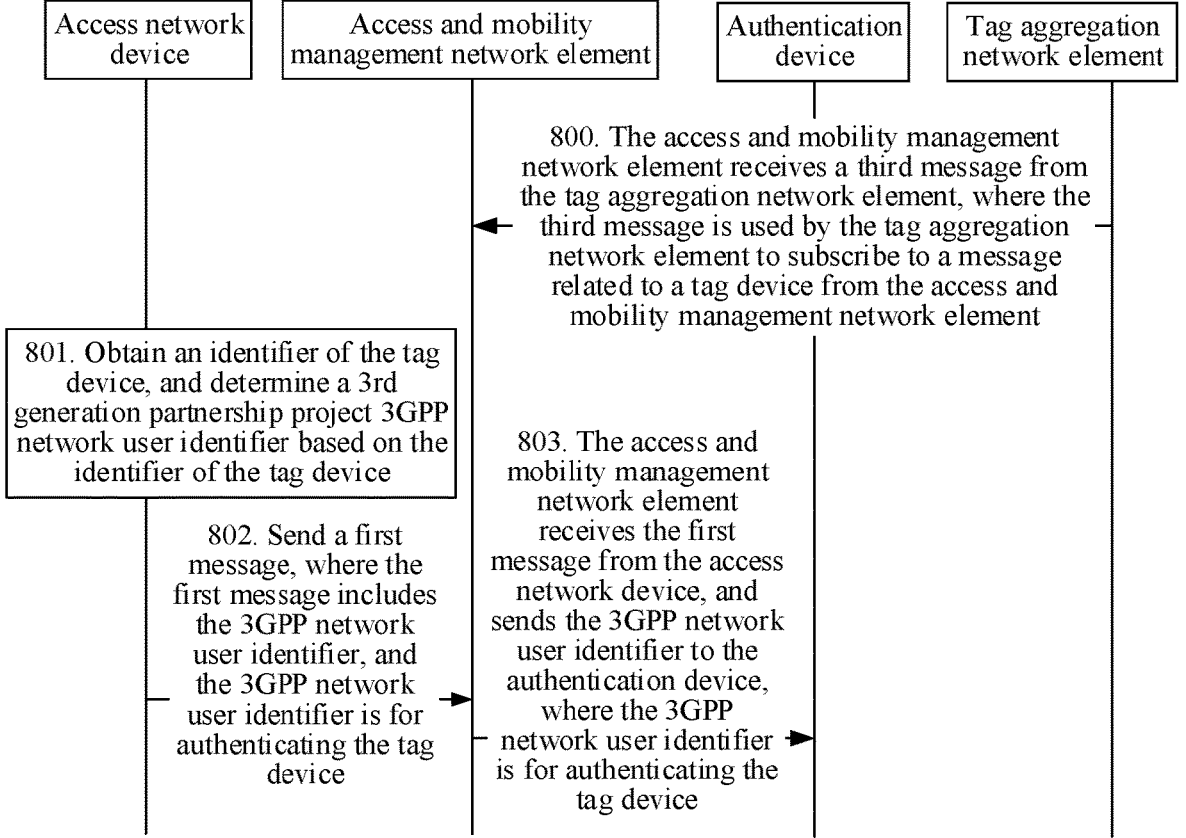
FIG. 8b is another schematic flowchart of an authentication method according to an embodiment of this application.

For example, refer to FIG. 8b. The authentication method according to this embodiment of this application further includes step 800.

800. The access and mobility management network element receives a third message from the tag aggregation network element, where the third message is used by the tag aggregation network element to subscribe to the message related to the tag device from the access and mobility management network element.

The tag aggregation network element may be an independently deployed core network element, or may be integrated into another network element, for example, may be integrated into a user plane function network element, the access and mobility management network element, a session management network element, a network exposure function network element, a server, or an internet of things platform. When the tag aggregation network element is integrated into the user plane function network element, the access and mobility management network element, the session management network element, the network exposure function network element, the server, or the internet of things platform, the tag aggregation network element may exchange, through an internal interface, a message with the network element integrated with the tag aggregation network element.

In a possible implementation, the third message includes a message type, and the message type indicates the message related to the tag device. For example, the third message includes a message type "RFID", indicating the access and mobility management network element to route a message related to the RFID tag to the tag aggregation network element. Alternatively, the third message includes a message type "UWB", indicating the access and mobility management network element to route a message related to the UWB tag to the tag aggregation network element.

When completing configuration based on the received second message, the access network device (or the tag access network element included in the access network device) may send a response message to the access and mobility management network element. The access and mobility management network element receives the response message, determines that the response message is the message related to the tag device, and routes the response message to the tag aggregation network element.

In a possible implementation, after the security authentication on the tag device is completed according to steps 801 to 805, a secure communication operation may be performed between the tag device and the access network device.

For example, the tag aggregation network element first determines whether security authentication on the tag device succeeds. If the tag aggregation network element determines that security authentication on the tag device succeeds, the tag aggregation network element sends an operation instruction to the access network device, where the operation instruction indicates the access network device to perform a communication operation with the tag device.

For example, the tag aggregation network element may send the operation instruction to the access network device via the access and mobility management network element. The operation instruction may be the access series commands between the tag and the reader in the procedure shown in FIG. 4, for example, may be a command such as "KeyUpdate", "Read", or "Write" in the access series commands.

In a possible implementation, that the tag aggregation network element determines whether security authentication on the tag device succeeds includes: if a 3GPP network user identifier corresponding to the identifier of the tag device is obtained from the authentication device based on the identifier of the tag device, determining that security authentication on the tag device succeeds.

For example, the tag aggregation network element obtains the identifier of the tag device from an AF, and queries, based on the identifier of the tag device, the authentication device for the 3GPP network user identifier corresponding to the identifier of the tag device. If the 3GPP network user identifier corresponding to the identifier of the tag device is stored in the authentication device, it indicates that security authentication on the tag device already succeeds. The 3GPP network user identifier corresponding to the identifier of the tag device is the 3GPP network user identifier determined based on the identifier of the tag device, for example, an SUPI determined based on the SID of the tag device.

In the scenario in which the access network device includes the tag access function module and the tag agent function module, the tag access function module receives, via the access and mobility management network element, the operation instruction sent by the tag aggregation network element. The tag agent function module may further send the operation instruction to the tag access function module through an internal interface between the tag agent function module and the tag access function module, and the tag access function module triggers the communication operation with the tag device. For example, the tag access function module sends a "KeyUpdate" command to the tag device, to indicate the tag device to update a key. The "KeyUpdate" command may be the "KeyUpdate" command in the access series commands used between the tag and the reader in the procedure shown in FIG. 4.

In a possible implementation, the tag agent function module may further maintain a correspondence between an identifier of the tag access function module, the identifier of the tag device, and the 3GPP network user identifier of the tag device. When the tag agent function module corresponds to a plurality of tag access function modules, the received operation instruction may be routed to a corresponding tag access function module based on the maintained correspondence.

For example, the tag agent function module generates first information, where the first information indicates a correspondence between the identifier of the tag device, the identifier of the tag access function module, and the 3GPP network user identifier.

The tag agent function module may further address the tag access function module based on the first information. For example, the tag agent function module receives the operation instruction from the tag aggregation network element, addresses the corresponding tag access function module based on the first information, and routes the operation instruction to the tag access function module. For example, after receiving a NAS message that carries an operation instruction, the tag agent function network element determines an SUPI/SUCI based on a correspondence between a NAS connection and the SUPI/SUCI. Further, the tag agent function module determines a corresponding tag access function module based on the SUPI/SUCI and the correspondence indicated by the first information, and sends the operation instruction to the tag access function module, so that the tag access function module can deliver the operation instruction to a corresponding tag device.

In a possible implementation, if no 3rd generation partnership project 3GPP network user identifier corresponding to the identifier of the tag device is obtained from the authentication device based on the identifier of the tag device, the tag aggregation network element determines that security authentication on the tag device fails. In this case, steps 801 to 805 are performed to perform security authentication on the tag device. Before performing security authentication on the tag device, the tag aggregation network element may further configure the parameter related to the tag device for the access network device. For a specific authentication process and a parameter configuration process, refer to the foregoing descriptions. Details are not described herein again.

It should be noted that, in this embodiment of this application, a procedure related to the tag device may be divided into a parameter configuration phase, a security authentication phase, and an access phase. In the parameter configuration phase, the tag aggregation network element may further configure the parameter related to the tag device for the access network device. The security authentication phase is the foregoing steps 801 to 805. In the access phase, the tag aggregation network element sends the operation instruction to the access network device, and the tag device and the access network device perform corresponding communication operations, such as read and write operations, based on the operation instruction.

An execution sequence of the foregoing three phases is not limited in this embodiment of this application. In a possible implementation, the parameter configuration phase, the security authentication phase, and the access phase are performed in sequence. In addition, one of the foregoing three phases may be selected for execution, and the three phases are not indispensable.

Figure 9A:
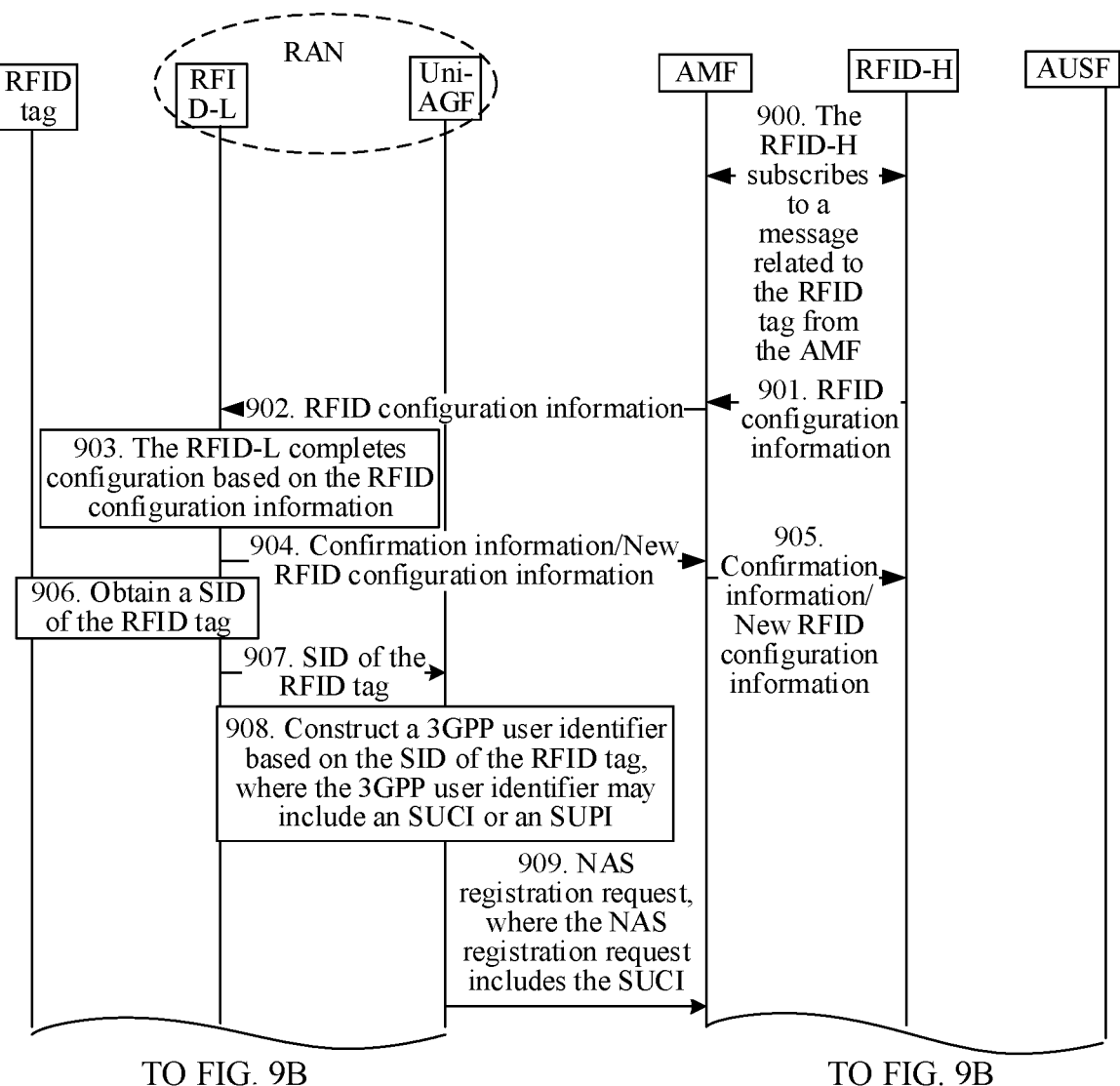
FIG. 9A and FIG. 9B are a schematic flowchart of security authentication on an RFID tag according to an embodiment of this application.
Figure 9B:
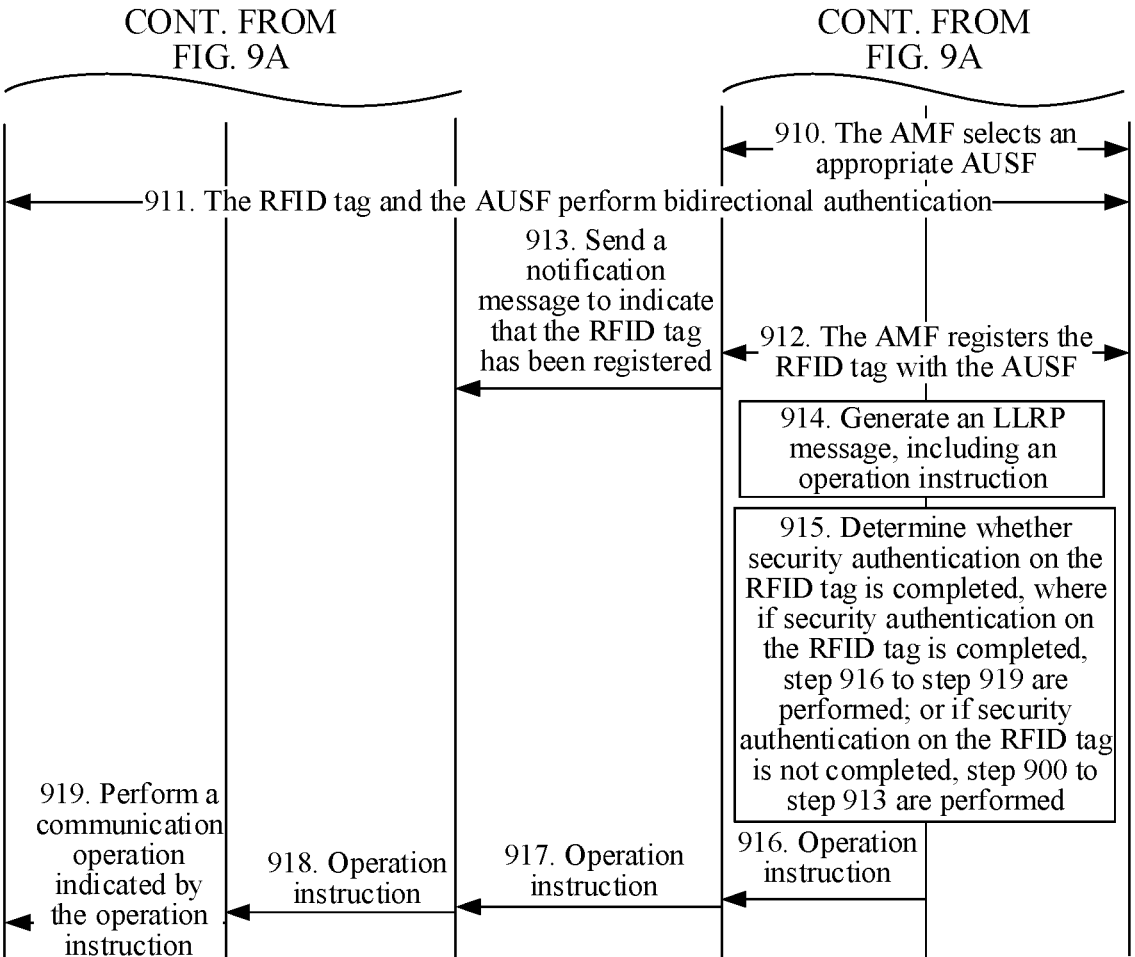

The following describes in detail the authentication method provided in embodiments of this application with reference to the accompanying drawings. The method is applicable to the system shown in FIG. 5, and may perform security authentication on an RFID tag. The tag device is the RFID tag, the access network device (RAN) includes the tag access function module and the tag agent function module. The tag access function module is an RFID-L, and the tag agent function module is a Uni-AGF. The tag aggregation network element is an RFID-H, and the authentication device is an AUSF/UDM. The access and mobility management network element is an AMF. As shown in FIG. 9A and FIG. 9B, the method includes the following steps.

900. The RFID-H subscribes to a message related to the RFID tag from the AMF.

For example, the RFID-H may perform device-level communication with the RAN. In other words, the message exchanged between the RFID-H and the RAN is not for specific UE. The RFID-H may exchange an RFID-type message with the RAN via the AMF. For example, the RFID-H sends a service-oriented message Namf_Communication_NonUeMessageTransfer to the AMF, where the message includes an N2 message and a field "N2inforType" indicating a type of the N2 message. A value of the field "N2inforType" is "RFID", indicating that the RFID-H sends a message of the "RFID" type. The AMF sends the received N2 message to the RAN. Optionally, the AMF may further send the field "N2inforType" to the RAN, to indicate the RFID-H to send the message of the "RFID" type.

The RFID-H may further indicate, in a subscription/notification manner, the AMF to forward the received uplink N2 message of the "RFID" type to the RFID-H network element. For example, the RFID-H network element may subscribe to the message of the "RFID" type from the AMF by using an Namf_Communication_NonUeInfoSubscribe message.

After receiving the message of the "RFID" type sent by the RAN side, the AMF may send an Namf_Communication_NonUeInfoNotify message to the RFID-H, where the message includes the message of the "RFID" type sent by the RAN side.

The RFID-H receives the message and may obtain the message of the "RFID" type sent by the RAN side.

For example, the message of the "RFID" type may be an LLRP protocol message, that is, the RFID-L and the RFID-H interact with each other by using the LLRP protocol (or another adaptation protocol). The RFID-H may send a downlink LLRP protocol message to the AMF by using a service-oriented message Namf_Communication_NonUeMessageTransfer, and then the AMF sends the LLRP protocol message to the RAN (which may be specifically the RFID-L on the RAN side).

It should be noted that, when the RFID-H is a network element of a core network, security of the RFID-H may be determined, and the RFID-H may directly communicate with another network element of the core network. When the RFID-H is a third-party application but not a network element of a core network, security of the RFID-H is uncertain. The RFID-H network element cannot directly communicate with another network element of the core network. Instead, the RFID-H needs to communicate via a network exposure function (network exposure function, NEF). The message sent by the RFID-H needs to be forwarded to the another network element of the core network through the NEF network element.

901. The RFID-H sends RFID configuration information to the AMF.

The RFID configuration information is the parameter related to the tag device described above, and includes at least one of a protocol parameter, a communication parameter, and an access parameter. For descriptions of the protocol parameter, the communication parameter, and the access parameter, refer to the foregoing descriptions. Details are not described herein again.

For example, the RFID-H transmits the RFID configuration information to the AMF by using a service-oriented message Namf_Communication_NonUeMessageTransfer. For example, the RFID-H may send an N2 message container including the RFID configuration information to the AMF, and the AMF forwards the RFID configuration information to the RAN by using an N2 message.

In a possible implementation, the RFID configuration information may include the following three items:

a capability negotiation message (that is, the protocol parameter described above), for negotiating a supported protocol version with the RFID-L, and indicating the RFID-L to use the negotiated protocol version;

a device configuration message (that is, the communication parameter described above), for configuring a basic running parameter of the RFID-L, which, for example, may be a data transmission rate or a coding scheme; and the access parameter, which may be tag access (or inventory) operation setting information or tag access (or inventory) operation update information. Optionally, the access parameter is for configuring a tag access (or storage) event in the RFID-L, trigger time of the event, a periodicity of the event, a tag quantity of the trigger event, and content reported after the trigger event.

902. The AMF sends the RFID configuration information to the RFID-L.

For example, after receiving the RFID configuration information sent by the RFID-H, the AMF constructs a dedicated N2 message "DOWNLINKNON UE ASSOCIATED RFID TRANSPORT", and sends the constructed message to the RAN. After receiving the message, the RAN node forwards the RFID configuration information to the RFID-L.

903. The RFID-L completes configuration based on the RFID configuration information.

For example, the RFID-L completes setting or update of capability negotiation, device configuration, and tag access (inventory) operations based on the received RFID configuration information.

904. The RFID-L sends confirmation information/new RFID configuration information to the AMF.

When the RFID-L uses the RFID configuration information delivered in step 902, step 903 is performed to complete the configuration, and the confirmation information may be sent to the AMF in step 904.

Optionally, when the RFID-L does not acknowledge the RFID configuration information delivered in step 902, step 903 may be skipped, and the RFID-L further negotiates the RFID configuration information with the RFID-H in step 904. For example, the RFID-L constructs the new RFID configuration information, and sends the new RFID configuration information to the AMF. For example, a dedicated uplink N2 message forwarded by the AMF to the RFID-H is for negotiation, where the dedicated uplink N2 message includes the new RFID configuration information.

905. The AMF sends the confirmation information/the new RFID configuration information to the RFID-H based on subscription of the RFID-H.

As described in step 900, the RFID-H has subscribed to the N2 message of the "RFID" type from the AMF by using Namf_Communication_NonUeInfoSubscribe. After receiving the new RFID configuration information, the AMF encapsulates the new RFID configuration information and sends the encapsulated new RFID configuration information to the RFID-H network element. For example, the AMF encapsulates the RFID configuration information by using Namf_Communication_NonUeInfoNotify, and then forwards the RFID configuration information to the RFID-H network element.

It should be noted that, if uplink and downlink signaling exchange may be performed for a plurality of times between the RFID-H and the RAN (the RFID-L), that is, steps 901 to 905 may be performed for a plurality of times. In addition, there is no necessary correspondence between downlink signaling and uplink signaling. For example, in step 903, partial configuration may be completed based on the RFID configuration information, and step 904 is performed once or a plurality of times to negotiate other parameters with the RFID-H.

906. The RFID-L obtains a SID of the RFID tag.

It should be noted that, the RFID tag and the RFID-L may use a SID or an EPC code as an identifier of the RFID tag. After the RFID-L obtains the SID of the RFID tag through a tag identification (Tag Identification) process, a further mutual authentication process is triggered to perform security authentication on the RFID tag.

In the mutual authentication procedure, the RFID-L needs to obtain, from the core network or a third party, a security parameter that is for mutual authentication, for example, an encryption key and/or an integrity protection key.

907. The RFID-L sends the SID of the RFID tag to the Uni-AGF.

For example, the RFID-L interacts with the Uni-AGF through an internal interface between the RFID-L and the Uni-AGF, and triggers the Uni-AGF to establish a NAS connection for the currently authenticated RFID tag, to interact with the core network to perform security authentication on the RFID tag.

It should be noted that, in an interaction process, the Uni-AGF may obtain an identifier of the RFID-L, and the RFID-L sends the SID of the RFID tag to the Uni-AGF.

908. The Uni-AGF constructs a 3GPP user identifier based on the SID of the RFID tag. The 3GPP user identifier may include an SUCI or an SUPI.

In a possible implementation, security authentication is performed on the RFID tag based on the SUCI. For example, the Uni-AGF constructs an SUPI by using the SID based on a network access identifier (NAI) format defined in RFC 7542, and subsequently converts the SUPI into an SUCI. The SUCI includes the encrypted SUPI. In a possible implementation, alternatively, the Uni-AGF may directly determine the SUCI based on the SID, or may construct the SUCI based on the EPC code.

In another possible implementation, security authentication is performed on the RFID tag based on the SUPI. For example, in step 906, the Uni-AGF determines the SUPI based on an identifier (for example, the SID or the EPC code) reported by the RFID tag, and reports the SUPI to the AMF. Subsequently, security authentication may be performed on the RFID tag based on the SUPI. In this implementation, the 3GPP network user identifier of the RFID tag may be the SUPI. In step 908, the AMF receives the SID or the EPC code sent by the RFID-L, and constructs the SUPI based on the SID or the EPC code.

For example, the Uni-AGF attempts to establish a NAS connection for the RFID tag. Optionally, the Uni-AGF may further store a correspondence between the identifier of the RFID-L, the SID of the RFID tag, and the SUPI (or the SUCI) of the RFID tag. Currently, the Uni-AGF may be responsible for a plurality of RFID-Ls, and the Uni-AGF may address, based on the stored correspondence, one RFID-L for which the Uni-AGF is responsible.

909. The Uni-AGF sends a NAS registration request to the AMF, where the NAS registration request includes the SUCI or the SUPI.

The Uni-AGF sends the NAS registration request to the AMF, and attempts to establish the NAS connection for the RFID tag. Subsequent mutual authentication messages are all forwarded by the Uni-AGF. The NAS registration request may be the first message in embodiments of this application.

It should be noted that, the NAS registration request includes the SUCI, so that a network side performs security authentication on the RFID tag based on the SUCI. In addition to the SUCI, the NAS registration request may further carry type information "RFID Indicator" of the RFID tag. "RFID Indicator" indicates a type of a device for which the Uni-AGF establishes a NAS connection.

"RFID Indicator" may also affect an authentication process. For example, the authentication device may select different authentication methods and parameters based on the type of the device. The authentication method defined in ISO 29167-19 is used as an example. The RFID-L needs to obtain an encryption key and a message authentication key corresponding to the RFID tag from a database (for example, the UDM), and the UDM may further perform a corresponding authentication method based on an indication of "RFID Indicator". The authentication method defined in 3GPP is used as an example. The UDM stores the root key, and an intermediate network element (for example, the AMF) performs derivation based on the root key and sends derived information to the RAN side (the RFID-L) and the tag device (the RFID tag).

910. The AMF selects an appropriate AUSF.

A principle for the AMF to select the AUSF is the same as that in section 6.3.4 in 3GPP TS 23.501. After selecting the AUSF, the AMF establishes a path "tag↔RFID-L↔AMF↔AUSF↔UDM".

911. The RFID tag and the AUSF perform bidirectional authentication.

For example, the AUSF and the RFID tag may exchange authentication-related signaling based on the foregoing path, to complete bidirectional authentication. The AUSF may authenticate the RFID tag based on the 3GPP user identifier (that is, the SUCI or the SUPI) of the RFID tag sent by the AMF.

It may be understood that, authentication procedures vary with device types and authentication methods supported by the devices. For example, an RFID standardization or vendor-defined authentication method may be used, and the foregoing channel is for transmitting RFID standardization or vendor-defined authentication signaling.

Alternatively, an extensible authentication protocol (EAP) authentication method supported by a 5G network may be used. In this case, a procedure defined in TS 33.501 is directly used.

It should be noted that the AUSF may alternatively obtain a security parameter (a key or the like) from a third-party AAA-S, and the AUSF and the AAS-S interact with each other through an AAA interface or indirectly via an AAA-P network element. In this case, an established security authentication signaling exchange channel is: tag↔RFID-L↔AMF↔AUSF↔AAA-S, or tag↔RFID-L↔AMF↔AUSF↔AAA-S↔AMF↔AUSF↔AAA-P↔AAA-S. Related security parameters are stored on a third-party network element. This reduces dependency on operators and facilitates cross-operator authentication.

Optionally, the AUSF may further send an authentication result of the RFID tag to the RFID-L via the AMF.

912. The AMF registers the RFID tag with the AUSF.

In this process, the AUSF may store the SUPI corresponding to the SID of the RFID tag.

913. The AMF sends a notification message to the Uni-AGF, indicating that the RFID tag completes registration.

It should be noted that, if the authentication process fails or the registration process fails, the Uni-AGF ends the registration process. For example, if the authentication fails in step 911, the RFID-L notifies the Uni-AGF of the authentication result, and the Uni-AGF ends the registration procedure. Alternatively, if the Uni-AGF receives a registration failure message sent by the AMF in step 913, the Uni-AGF ends the registration procedure. For example, the Uni-AGF may stop a NAS timer to end the registration procedure.

Step 913 is an optional step. The Uni-AGF may also obtain, in another manner, information indicating that the RFID tag completes registration. For example, the Uni-AGF may obtain, from the RFID-L, information indicating that the RFID tag is successfully registered. For example, in step 911, after receiving, via the AMF, the authentication result sent by the AUSF, the RFID-L may notify the Uni-AGF of whether authentication on the RFID tag succeeds. If the authentication succeeds, it is considered that the registration succeeds.

914. The RFID-H generates an LLRP message, including an operation instruction.

The LLRP message includes an access command, and the access instruction is the operation instruction described in this embodiment of this application. The operation instruction is an access operation to be performed for a target tag, for example, may be the access series commands used between the tag and the reader in the procedure shown in FIG. 4. For example, the operation instruction may be a "Read" command, a "Write" command, or a "KeyUpdate" command that indicates the RFID tag to execute.

915. The RFID-H determines whether security authentication on the RFID tag is completed, where if security authentication on the RFID tag is completed, steps 916 to 919 are performed, or if security authentication on the RFID tag is not completed, steps 900 to 913 are performed.

For example, if the RFID-H can find, in the AUSF (or UDM), the SUPI corresponding to the SID of the RFID tag, it indicates that security authentication on the RFID tag has been completed. The RFID-H may send, by using a NAS message, the LLRP message to the RFID-L serving the RFID tag, to indicate the RFID tag to execute the access command, for example, the "Read" command or the "Write" command.

Otherwise, the RFID-L triggers an authentication process, and steps 900 to 913 are supported. Optionally, in step 901, an access request may be reported. After mutual authentication between the RFID tag and the AUSF is completed, an access operation is automatically triggered, to indicate the RFID tag to execute an access command.

Optionally, the RFID-H may obtain the operation instruction from a third-party application server (for example, an AF), and then notify, by using downlink signaling, the RFID-L and the RFID tag to execute the operation instruction. Alternatively, the RFID-H generates the operation instruction, and then notifies, by using downlink signaling, the RFID-L and the RFID tag to execute the operation instruction.

916. The RFID-H sends the operation instruction to the AMF.

For example, the RFID-H transfers the LLRP message including the operation instruction to the AMF by using a service-oriented message Namf_Communication_N1N2MessageTransfer.

917. The AMF sends the operation instruction to the Uni-AGF.

For example, the AMF forwards the operation instruction to the Uni-AGF by using a NAS message.

918. The Uni-AGF sends the operation instruction to the corresponding RFID-L.

For example, the Uni-AGF routes, based on the stored correspondence, the downlink LLRP message to the RFID-L corresponding to the RFID tag.

919. The RFID-L executes a communication operation indicated by the operation instruction.

For example, after parsing the operation instruction, the RFID-L executes a corresponding communication operation, for example, indicates the RFID tag to execute a KeyUpdate command, or indicates the RFID tag to execute a Read command.

It should be noted that, if SUPI information corresponding to the SID is not found in the AUSF or the UDM in step 915, it indicates that the RFID tag has not performed the mutual authentication procedure, and steps 900 to 905 need to be performed again. If subscription has been completed in step 900, step 900 may be skipped.

In addition, an operation instruction may be carried in step 901 to trigger the RFID-L to perform inventory (access). After the SID of the RFID tag is obtained, the mutual authentication process is triggered, that is, steps 906 to 913 are performed. After subsequent authentication is completed, the RFID tag directly executes the operation instruction carried in step 901.

In the procedure shown in FIG. 9A and FIG. 9B, steps 900 to 905 may be referred to as a parameter configuration procedure, steps 906 to 913 may be referred to as a bidirectional authentication procedure, and steps 914 to 919 may be referred to as a secure access procedure. An execution sequence of the three procedures in the method shown in FIG. 9A and FIG. 9B is not limited in this embodiment of this application. In a possible implementation, the parameter configuration procedure, the bidirectional authentication procedure, and the secure access procedure are performed in sequence. In addition, one of the foregoing three procedures may be selected for execution, and the three procedures are not indispensable.

It should be noted that the RFID-H may be independently deployed, or integrated into another core network element. When the RFID-H is integrated into the AMF, message exchange between the RFID-H and the AMF may be omitted or considered to be performed through an internal interface. When both the Uni-AGF and the RFID-L are deployed on the RAN, message exchange between the Uni-AGF and the RFID-L may also be omitted or considered to be performed through an internal interface.

In the method shown in FIG. 9A and FIG. 9B, the security authentication procedure of the RFID tag is implemented based on a possible tag convergence architecture. For example, functions of the RFID reader and some higher-layer components are integrated into a 3GPP network, and a bidirectional authentication procedure at a device granularity is implemented in a manner of establishing a NAS connection by the Uni-AGF. The method shown in FIG. 9A and FIG. 9B may also be applied to an architecture in which the RFID tag accesses the core network through a non-3GPP technology. In this case, the RFID-L and the Uni-AGF are implemented by a non-3GPP interworking function (for example, an N3IWF or a TNGF shown in the figure). Alternatively, the RAN in the method shown in FIG. 9A and FIG. 9B is replaced by a non-3GPP interworking function.

Figure 10A:
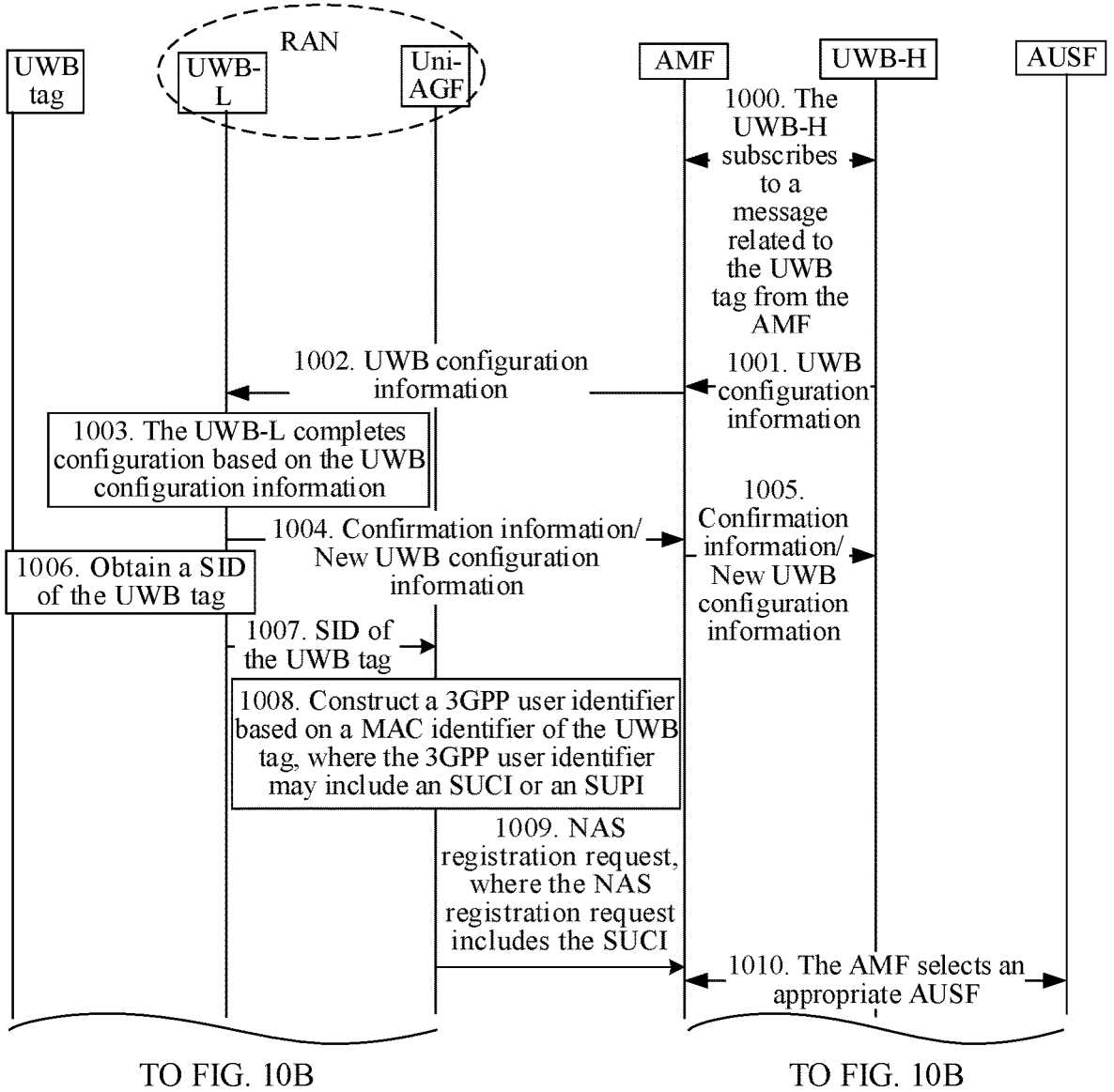

An embodiment of this application further provides an authentication method. The method is applicable to the system shown in FIG. 5, to perform security authentication on a UWB tag. The tag device is the UWB tag, the access network device includes the tag access function module and the tag agent function module. The tag access function module is a UWB-L, and the tag agent function module is a Uni-AGF. The tag aggregation network element is a UWB-H, and the authentication device is an AUSF/UDM. The access and mobility management network element is an AMF. As shown in FIG. 10A and FIG. 10B, the method includes the following steps.

1000. The UWB-H subscribes to a message related to the UWB tag from the AMF.

For example, the UWB-H may perform device-level communication with the RAN. In other words, the message exchanged between the UWB-H and the RAN is not for specific UE. The UWB-H may exchange a UWB-type message with the RAN via the AMF. For example, the UWB-H sends a service-oriented message Namf_Communication_NonUeMessageTransfer to the AMF, where the message includes an N2 message and a field "N2inforType" indicating a type of the N2 message. A value of the field "N2inforType" is "UWB", indicating that the UWB-H sends a message of the "UWB" type. The AMF sends the received N2 message to the RAN. Optionally, the AMF may further send the field "N2inforType" to the RAN, to indicate UWB-H to send the message of the "UWB" type.

The UWB-H may further indicate, in a subscription/notification manner, the AMF to forward the received uplink N2 message of the "UWB" type to the UWB-H network element. For example, the UWB-H network element may subscribe to the message of the "UWB" type from the AMF by using an Namf_Communication_NonUeInfoSubscribe message.

After receiving the message of the "UWB" type sent by the RAN side, the AMF may send an Namf_Communication_NonUeInfoNotify message to the UWB-H, where the message includes the message of the "UWB" type sent by the RAN side.

The UWB-H receives the message and may obtain the message of the "UWB" type sent by the RAN side.

For example, the message of the "UWB" type may be UWB application layer information, that is, the UWB-L and the UWB-H interact with each other by using a UWB protocol (or another adaptation protocol). The UWB-H may send downlink UWB application layer information to the AMF by using a service-oriented message Namf_Communication_NonUeMessageTransfer, and then the AMF sends the UWB application layer information to the RAN (which may be specifically the UWB-L on the RAN side).

It should be noted that, when the UWB-H is a network element of a core network, security of the UWB-H may be determined, and the UWB-H may directly communicate with another network element of the core network. When the UWB-H is a third-party application but not a network element of a core network, security of the UWB-H is uncertain. The UWB-H network element cannot directly communicate with another network element of the core network. Instead, the UWB-H needs to communicate via a network exposure function (network exposure function, NEF). The message sent by the UWB-H needs to be forwarded to the another network element of the core network through the NEF network element.

1001. The UWB-H sends UWB configuration information to the AMF.

The UWB configuration information is the parameter related to the tag device described above, and includes at least one of a protocol parameter, a communication parameter, and an access parameter. For descriptions of the protocol parameter, the communication parameter, and the access parameter, refer to the foregoing descriptions. Details are not described herein again. In the embodiment shown in FIG. 10A and FIG. 10B, the UWB configuration information may alternatively not include the access parameter. This is not limited in this embodiment of this application.

For example, the UWB-H sends the UWB configuration information to the AMF by using a service-oriented message Namf_Communication_NonUeMessageTransfer. For example, the UWB-H may send an N2 message container including the UWB configuration information to the AMF, and the AMF forwards the UWB configuration information to the RAN by using an N2 message.

In a possible implementation, the UWB configuration information may include the following two items:

a capability negotiation message (that is, the protocol parameter described above), for negotiating a supported protocol version with the UWB-L, and indicating the UWB-L to use the negotiated protocol version; and a device configuration message (that is, the communication parameter described above), for configuring a basic running parameter of the UWB-L, which, for example, may be a data transmission rate or a coding scheme; and

1002. The AMF sends the UWB configuration information to the UWB-L.

For example, after receiving the UWB configuration information sent by the UWB-H, the AMF constructs a dedicated N2 message "DOWNLINKNON UE ASSOCIATED UWB TRANSPORT", and sends the constructed message to the RAN. After receiving the message, the RAN node forwards the UWB configuration information to the UWB-L.

1003. The UWB-L completes configuration based on the UWB configuration information.

For example, the UWB-L completes setting or update of capability negotiation, device configuration, and tag access (inventory) operations based on the received UWB configuration information.

1004. The UWB-L sends confirmation information/new UWB configuration information to the AMF.

When the UWB-L uses the UWB configuration information delivered in step 902, step 903 is performed to complete the configuration, and the confirmation information may be sent to the AMF in step 904.

Optionally, when the UWB-L does not acknowledge the UWB configuration information delivered in step 1002, step 1003 may be skipped, and the UWB-L further negotiates the UWB configuration information with the UWB-H in step 1004. For example, the UWB-L constructs the new UWB configuration information, and sends the new UWB configuration information to the AMF. For example, a dedicated uplink N2 message is forwarded by the AMF to the UWB-H, where the dedicated uplink N2 message includes the new UWB configuration information.

1005. The AMF sends the confirmation information/the new UWB configuration information to the UWB—H based on subscription of the UWB-H.

As described in step 1000, the UWB-H has subscribed to the N2 message of the "UWB" type from the AMF by using Namf_Communication_NonUeInfoSubscribe. After receiving the new UWB configuration information, the AMF encapsulates the new UWB configuration information and sends the encapsulated new UWB configuration information to the UWB-H network element. For example, the AMF encapsulates the UWB configuration information by using Namf_Communication_NonUeInfoNotify, and then forwards the UWB configuration information to the UWB-H network element.

It should be noted that, if uplink and downlink signaling exchange may be performed for a plurality of times between the UWB-H and the RAN (the UWB-L), that is, steps 1001 to 1005 may be performed for a plurality of times. In addition, there is no necessary correspondence between downlink signaling and uplink signaling. For example, in step 1003, partial configuration may be completed based on the UWB configuration information, and step 1004 is performed once or a plurality of times to negotiate other parameters with the UWB-H.

1006. The UWB-L obtains a MAC identifier of the UWB tag.

It should be noted that, the UWB tag and the UWB-L may use the MAC identifier as a unique identifier of the UWB tag. After the UWB-L obtains the MAC identifier of the UWB tag through a tag identification (Tag Identification) process, a further mutual authentication process is triggered to perform security authentication on the UWB tag.

In the mutual authentication procedure, the UWB-L needs to obtain, from the core network or a third party, a security parameter that is for mutual authentication, for example, an encryption key and/or an integrity protection key.

1007. The UWB-L sends the MAC identifier of the UWB tag to the Uni-AGF.

For example, the UWB-L interacts with the Uni-AGF through an internal interface between the UWB-L and the Uni-AGF, and triggers the Uni-AGF to establish a NAS connection for the currently authenticated UWB tag, to interact with the core network to perform security authentication on the UWB tag.

It should be noted that, in an interaction process, the Uni-AGF may obtain an identifier of the UWB-L, and the UWB-L sends the MAC identifier of the UWB tag to the Uni-AGF.

1008. The Uni-AGF constructs a 3GPP user identifier based on the MAC identifier of the UWB tag. The 3GPP user identifier may include an SUCI or an SUPI.

In a possible implementation, security authentication is performed on the UWB tag based on the SUCI. For example, the Uni-AGF constructs an SUPI by using the MAC identifier based on a network access identifier (NAI) format defined in RFC 7542, and subsequently converts the SUPI into an SUCI. The SUCI includes the encrypted SUPI. In a possible implementation, alternatively, the Uni-AGF may directly determine the SUCI based on the MAC identifier.

In another possible implementation, security authentication is performed on the UWB tag based on the SUPI. For example, in step 1006, the Uni-AGF determines the SUPI based on the identifier reported by the UWB tag, and reports the SUPI to the AMF. Subsequently, security authentication may be performed on the UWB tag based on the SUPI. In this implementation, the 3GPP network user identifier of the UWB tag may be the SUPI. In step 1008, the AMF receives the MAC identifier sent by the UWB-L, and constructs the SUPI based on the MAC identifier.

For example, the Uni-AGF attempts to establish a NAS connection for the UWB tag. Optionally, the Uni-AGF may further store a correspondence between the identifier of the UWB-L, the MAC identifier of the UWB tag, and the SUPI (or the SUCI) of the UWB tag. Currently, the Uni-AGF may be responsible for a plurality of UWB-Ls, and the Uni-AGF may address, based on the stored correspondence, one UWB-L for which the Uni-AGF is responsible.

1009. The Uni-AGF sends a NAS registration request to the AMF, where the NAS registration request includes the SUCI or the SUPI.

The Uni-AGF sends the NAS registration request to the AMF, and attempts to establish the NAS connection for the UWB tag. Subsequent mutual authentication messages are forwarded by the Uni-AGF. The NAS registration request may be the first message in embodiments of this application.

It should be noted that, the NAS registration request includes the SUCI, so that a network side performs security authentication on the UWB tag based on the SUCI. In addition to the SUCI, the NAS registration request may further carry type information "UWB Indicator" of the UWB tag. "UWB Indicator" indicates a type of a device for which the Uni-AGF establishes a NAS connection.

"UWB Indicator" may also affect an authentication process. For example, the authentication device may select different authentication methods and parameters based on the type of the device. The authentication method defined in ISO 21167-19 is used as an example. The UWB-L needs to obtain an encryption key and a message authentication key corresponding to the UWB tag from a database (for example, the UDM), and the UDM may further perform a corresponding authentication method based on an indication of "UWB Indicator". The authentication method defined in 3GPP is used as an example. The UDM stores the root key, and an intermediate network element (for example, the AMF) performs derivation based on the root key and sends derived information to the RAN side (the UWB-L) and the tag device (the UWB tag).

1010. The AMF selects an appropriate AUSF.

A principle for the AMF to select the AUSF is the same as that in section 6.3.4 in 3GPP TS 23.501. After selecting the AUSF, the AMF establishes a path "tag↔UWB-L↔AMF↔AUSF↔UDM".

1011. The UWB tag and the AUSF perform bidirectional authentication.

For example, the AUSF and the UWB tag may exchange authentication-related signaling based on the foregoing path, to complete bidirectional authentication. The AUSF may authenticate the UWB tag based on the 3GPP user identifier (that is, the SUCI or the SUPI) of the UWB tag sent by the AMF.

It may be understood that, authentication procedures vary with device types and authentication methods supported by the devices. For example, a UWB standardization or vendor-defined authentication method may be used, and the foregoing channel is for transmitting UWB standardization or vendor-defined authentication signaling.

Alternatively, an EAP authentication method supported by a 5G network may be used. In this case, a procedure defined in TS 33.501 is directly reused.

It should be noted that the AUSF may alternatively obtain a security parameter (a key or the like) from a third-party AAA-S, and the AUSF and the AAS-S interact with each other through an AAA interface or indirectly via an AAA-P network element. In this case, an established security authentication signaling exchange channel is: tag↔UWB-L↔AMF↔AUSF↔AAA-S, or tag↔UWB-L↔AMF↔AUSF↔AAA-S↔AMF↔AUSF↔AAA-P↔AAA-S. Related security parameters are stored on a third-party network element. This reduces dependency on operators and facilitates cross-operator authentication.

Optionally, the AUSF may further send an authentication result of the UWB tag to the UWB-L via the AMF.

1012. The AMF registers the UWB tag with the AUSF.

In this process, the AUSF may store the SUPI corresponding to the MAC identifier of the UWB tag.

1013. The AMF sends a notification message to the Uni-AGF, indicating that registration is completed.

It should be noted that, if the authentication process fails or the registration process fails, the Uni-AGF ends the registration process. For example, if the authentication fails in step 1011, the UWB-L notifies the Uni-AGF of the authentication result, and the Uni-AGF ends the registration procedure. Alternatively, if the Uni-AGF receives a registration failure message sent by the AMF in step 1013, the Uni-AGF ends the registration procedure. For example, the Uni-AGF may stop a NAS timer to end the registration procedure.

Step 1013 is an optional step. The Uni-AGF may also obtain, in another manner, information indicating that the UWB tag completes registration. For example, the Uni-AGF may obtain, from the UWB-L, information indicating that the UWB tag is successfully registered. For example, in step 1011, after receiving the authentication result via the AMF, the UWB-L may notify the Uni-AGF of whether authentication on the UWB tag succeeds. If the authentication succeeds, it is considered that the registration succeeds.

1014. The UWB-H generates UWB application layer information, including an operation instruction.

The UWB application layer information includes an access command, and the access instruction is the operation instruction described in this embodiment of this application. The operation instruction indicates an access operation to be performed for a target tag. For example, the UWB application layer information may be similar to the access series commands used between the tag and the reader in the procedure shown in FIG. 4. For example, the operation instruction may be a "Read" command" command or a "Write" command that indicates the UWB tag to execute.

1015. The UWB-H determines whether security authentication on the UWB tag is completed, where if security authentication on the UWB tag is complete, steps 1016 to 1019 are performed, or if security authentication on the UWB tag is not completed, steps 1000 to 1013 are performed.

For example, if the UWB-H can find, in the AUSF (or the UDM), the SUPI corresponding to the MAC identifier of the UWB tag, it indicates that security authentication on the UWB tag has been completed. The UWB-H may send, by using a NAS message, the UWB application layer information to the UWB-L serving the UWB is located, to indicate the UWB tag to execute the access command, for example, the "Read" command or the "Write" command.

Otherwise, the UWB-L triggers an authentication process, and steps 1000 to 1013 are supported. Optionally, in step 1001, an access request may be reported. After mutual authentication between the UWB tag and the AUSF is completed, an access operation is automatically triggered, to indicate the UWB tag to execute an access command.

Optionally, the UWB-H may obtain the operation instruction from a third-party application server (for example, an AF), and then notify, by using downlink signaling, the UWB-L and the UWB tag to execute the operation instruction. Alternatively, the UWB-H generates the operation instruction, and then notifies, by using downlink signaling, the UWB-L and the UWB tag to execute the operation instruction.

1016. The UWB-H sends the operation instruction to the AMF.

For example, the UWB-H transfers the UWB application layer information including the operation instruction to the AMF by using a service-oriented message Namf_Communication_N1N2MessageTransfer.

1017. The AMF sends the operation instruction to the Uni-AGF.

For example, the AMF forwards the operation instruction to the Uni-AGF by using a NAS message.

1018. The Uni-AGF sends the operation instruction to the corresponding UWB-L.

For example, the Uni-AGF routes, based on the stored correspondence, the downlink UWB application layer information to the UWB-L corresponding to the UWB tag.

1019. The UWB-L executes a communication operation indicated by the operation instruction.

For example, after parsing the operation instruction, the UWB-L executes a corresponding communication operation, for example, indicates the UWB tag to execute a KeyUpdate command, or indicates the UWB tag to execute a Read command.

It should be noted that, if SUPI information corresponding to the MAC identifier is not found in the AUSF or the UDM in step 1015, it indicates that the UWB tag has not performed the mutual authentication procedure, and steps 1000 to 1005 need to be performed again. If subscription has been completed in step 1000, step 1000 may be skipped.

In addition, an operation instruction may be carried in step 1001 to trigger the UWB-L to perform inventory (access). After the MAC identifier of the UWB tag is obtained, the mutual authentication process is triggered, that is, steps 1006 to 1013 are performed. After subsequent authentication is completed, the UWB tag directly executes the operation instruction carried in step 1001.

In a specific implementation, the UWB-H may be independently deployed, or integrated into another core network element. When the UWB-H is integrated into the AMF, message exchange between the UWB-H and the AMF may be omitted or considered to be performed through an internal interface. When both the Uni-AGF and the UWB-L are deployed on the RAN, message exchange between the Uni-AGF and the UWB-L may also be omitted or considered to be performed through an internal interface.

In the procedure shown in FIG. 10A and FIG. 10B, steps 1000 to 1005 may be referred to as a parameter configuration procedure, steps 1006 to 1013 may be referred to as a bidirectional authentication procedure, and steps 1014 to 1019 may be referred to as a secure access procedure. An execution sequence of the three procedures in the method shown in FIG. 10A and FIG. 10B is not limited in this embodiment of this application. In a possible implementation, the parameter configuration procedure, the bidirectional authentication procedure, and the secure access procedure are performed in sequence. In addition, one of the foregoing three procedures may be selected for execution, and the three procedures are not indispensable.

In the method shown in FIG. 10A and FIG. 10B, the security authentication procedure of the UWB tag is implemented based on a possible tag convergence architecture. Specifically, functions of the UWB reader and some higher-layer components are integrated into a 3GPP network, and a bidirectional authentication procedure at a device granularity is implemented in a manner of establishing a NAS connection by the Uni-AGF. The method shown in FIG. 10A and FIG. 10B may also be applied to an architecture in which the UWB tag accesses the core network through non-3GPP. In this case, the UWB-L and the Uni-AGF are implemented by a non-3GPP interworking function (for example, an N3IWF or a TNGF shown in the figure). Alternatively, the RAN in the method shown in FIG. 9A and FIG. 9B is replaced by a non-3GPP interworking function.

Figure 11:
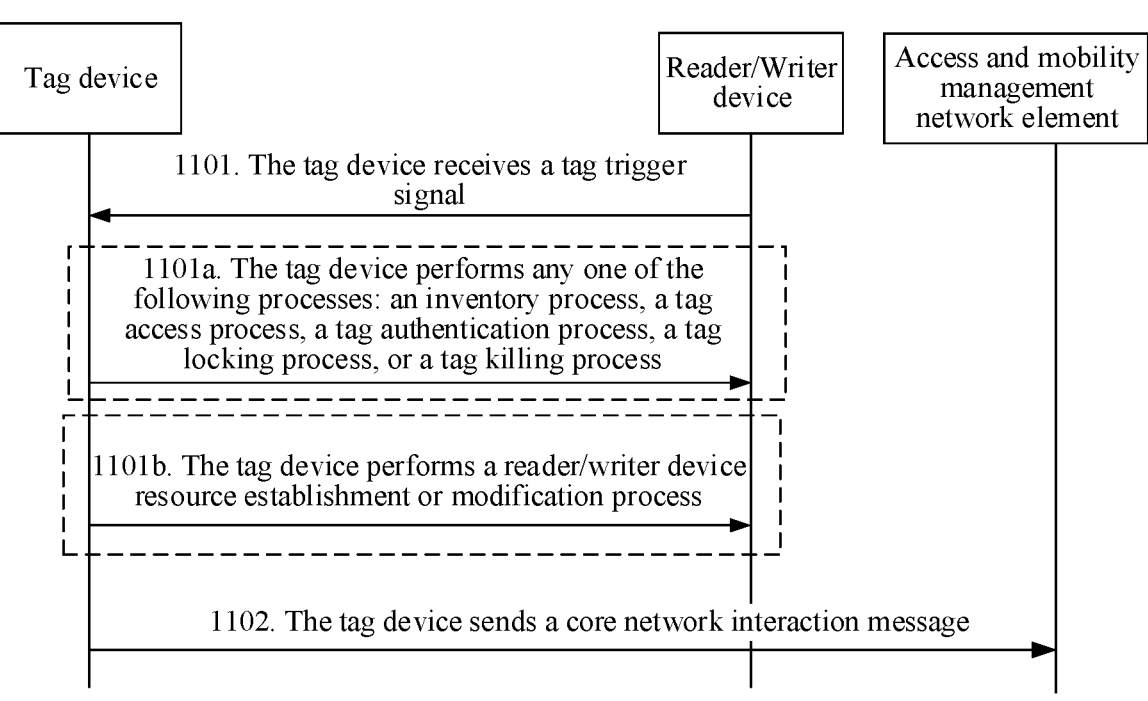
FIG. 11 is a schematic flowchart of a communication method according to an embodiment of this application.

Based on the foregoing authentication method, the tag device, the reader/writer device, and the core network element may complete authentication on different tag devices based on processes such as an inventory process, a tag access process, an authentication process, or a registration process. As shown in FIG. 11, an embodiment of this application further provides a communication method, so that the tag device can perform processes such as the storage process, the tag access process, the authentication process, or the registration process based on the communication method shown in FIG. 11, so that the reader/writer device and the core network element implement the foregoing authentication method, thereby reducing complexity of converged management. In addition, the tag device may further implement interaction with a core network by using the communication method shown in FIG. 11.

FIG. 11 shows a communication method according to an embodiment of this application. As shown in FIG. 11, the method may include the following steps.

1101. A tag device receives a tag trigger signal.

The tag device may receive a tag trigger signal sent by a reader/writer device. The reader/writer device may be deployed in an access network device or a terminal device. Alternatively, an access network device directly serves as the reader/writer device, or a terminal device directly serves as the reader/writer device.

When the tag device is a passive device, the tag trigger signal is required to stimulate the tag device, so that the tag device can send the core network interaction message, to interact with the core network element; or when the tag device is in a sleep state, the tag trigger signal is required to wake up the tag device, so that the tag device can send the core network interaction message, to interact with the core network element.

For example, the tag trigger signal may be for triggering an inventory process, the tag trigger signal may be for triggering a tag access process, the tag trigger signal may be for triggering a tag authentication process, the tag trigger signal may be for triggering a tag locking process, the tag trigger signal may be for triggering a tag killing process, or the tag trigger signal may be for tag device wakeup.

The inventory process is a tag identifier obtaining process, the tag access process is a process of performing a read operation or a write operation on the tag device, the tag authentication process is a process of authenticating the tag device, the tag locking process is a process of locking the tag device, the tag killing process is a process of killing the tag device, and the tag device wakeup is a process of waking up the tag device. In the tag locking process, all or part of content stored on the tag device cannot be modified.

Optionally, the tag trigger signal is any one of the following: a select select command, a challenge challenge command, a query query command, a read read command, a write write command, a kill kill command, a lock lock command, and a wakeup command.

When the tag trigger signal is a select select command or a query query command, the tag trigger signal may be for triggering the inventory process. When the tag trigger signal is a read command or a write command, the tag trigger signal may be for triggering the tag access process. When the tag trigger signal is a challenge challenge command, the tag trigger signal may be for triggering the tag authentication process. When the tag trigger signal is a kill kill command, the tag trigger signal may be for triggering the tag killing process. When the tag trigger signal is a lock lock command, the tag trigger signal may be for triggering a tag locking process. When the tag trigger signal is a wakeup command, the tag trigger signal may be for waking up the tag device.

1102. The tag device sends a core network interaction message.

The tag device may send the core network interaction message to an access and mobility management network element.

For example, the core network interaction message may include any one of the following: a registration message, a deregistration message, a session establishment request message, a session modification request message, a session deletion request message, a service request message, or a tag data sending message.

The registration message is for registering a tag with a core network, the deregistration message is for deregistering a tag from the core network, the session establishment request message is for establishing a session for a tag, the session modification request message is for modifying a session for a tag, the session deletion request message is for deleting a session for a tag, the service request message is for requesting a service for a tag, and the tag data sending message is for sending tag data. The tag data may be sensor data, preset data, or the like.

If the tag trigger signal is for triggering the inventory process, the core network interaction message may include the registration message, the session establishment request message, the session modification request message, the service request message, or the tag data sending message.

If the tag trigger signal is for triggering the tag access process, the core network interaction message may include the registration message, the session establishment request message, the session modification request message, the service request message, or the tag data sending message.

If the tag trigger signal is for triggering the tag authentication process, the core network interaction message may include the registration message, the session establishment request message, the session modification request message, the service request message, or the tag data sending message.

If the tag trigger signal is for triggering the tag locking process, the core network interaction message may include the registration message, the session establishment request message, the session modification request message, the service request message, or the tag data sending message.

If the tag trigger signal is for triggering the tag killing process, the core network interaction message may include the registration message, the deregistration message, the session deletion request message, the session modification request message, or the service request message.

If the tag trigger signal is for tag device wakeup, the core network interaction message may include the registration message, the session establishment request message, the session modification request message, the service request message, or the tag data sending message.

Optionally, the core network interaction message further carries a tag identifier or a session identifier.

The tag identifier or the session identifier may be obtained in the inventory process or the tag access process.

Optionally, the core network interaction message is a non-access stratum NAS message.

When the core network interaction message includes the registration message, the core network interaction message may be a NAS registration message. When the core network interaction message includes the deregistration message core network interaction message may be a NAS deregistration message. When the core network interaction message includes the session establishment request message, the core network interaction message may be a NAS session establishment request message. When the core network interaction message includes the session modification request message, the core network interaction message may be a NAS session modification request message. When the core network interaction message includes the session deletion request message, the core network interaction message may be a NAS session deletion request message. When the core network interaction message includes the service request message, the core network interaction message may be a NAS service request message. When the core network interaction message includes the tag data sending message, the core network interaction message may be a NAS tag data sending message.

Optionally, the tag device receives filtering information, and the tag device sends the core network interaction message if the tag device matches the filtering information.

The tag trigger signal may include the filtering information.

The filtering information may include the tag identifier, or may include filtering information that is set according to content stored in the tag device. The content stored in the tag device may include sensor information and the like.

Optionally, after receiving the tag trigger signal sent by the reader/writer device, the tag device may directly perform the foregoing step 1102, may first perform the following step 1101*a* and then perform the foregoing step 1102, or may first perform the following step 1101*b* and then perform the foregoing step 1102.

1101*a*. The tag device performs any one of the following processes: the inventory process, the tag access process, the tag authentication process, the tag locking process, the tag killing process, or the tag device wakeup.

The tag device may perform the foregoing procedure based on a corresponding tag trigger signal in a process of interacting with the reader/writer device.

1101*b*. The tag device performs a reader/writer device resource establishment or modification process.

The tag device may further perform the reader/writer device resource establishment or modification process in the process of interacting with the reader/writer device, to communicate with the reader/writer device based on an established resource or a modified resource.

Figure 12:
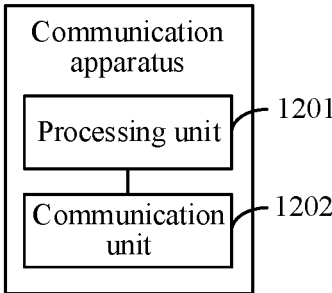
FIG. 12 and FIG. 13 each are another block diagram of a structure of a communication apparatus according to an embodiment of this application.

When each function module is obtained through division based on each corresponding function, FIG. 12 is a possible schematic diagram of a structure of a communication apparatus in the foregoing embodiments. The communication apparatus shown in FIG. 12 may be the access network device in embodiments of this application, may be a component that implements the foregoing methods in the access network device, or may be a chip used in the access network device. Alternatively, the communication apparatus shown in FIG. 12 may be the tag aggregation network element in embodiments of this application, may be a component that implements the foregoing methods in the tag aggregation network element, or may be a chip used in the tag aggregation network element. Alternatively, the communication apparatus shown in FIG. 12 may be the access and mobility management network element in embodiments of this application, may be a component that implements the foregoing methods in the access and mobility management network element, or may be a chip used in the access and mobility management network element.

The chip may be a system-on-a-chip (SOC), a baseband chip with a communication function, or the like. As shown in FIG. 12, the communication apparatus includes a processing unit 1201 and a communication unit 1202. The processing unit may be one or more processors, and the communication unit may be a transceiver or a communication interface.

The processing unit 1201 may be configured to support the communication apparatus in performing a processing action in the foregoing method embodiments. Specifically, the processing unit 1201 may perform a processing action performed by the access and mobility management network element in FIG. 8*a*, FIG. 8*b*, FIG. 9A and FIG. 9B, FIG. 10A and FIG. 10B, or FIG. 11, a processing action performed by the access network device in FIG. 8*a*, FIG. 8*b*, FIG. 9A and FIG. 9B, FIG. 10A and FIG. 10B, or FIG. 11, a processing action performed by the tag aggregation network element in FIG. 8*a*, FIG. 8*b*, FIG. 9A and FIG. 9B, FIG. 10A and FIG. 10B, or FIG. 11, or a processing action performed by the tag device in FIG. 8*a*, FIG. 8*b*, FIG. 9A and FIG. 9B, FIG. 10A and FIG. 10B, or FIG. 11, and/or may be configured to perform another process for the technology described in this specification.

The communication unit 1202 may be configured to support communication between the communication apparatus and another communication apparatus or device, and may specifically perform sending and/or receiving actions performed by the access and mobility management network element in FIG. 8*a*, FIG. 8*b*, FIG. 9A and FIG. 9B, FIG. 10A and FIG. 10B, or FIG. 11, sending and/or receiving actions performed by the access network device in FIG. 8*a*, FIG. 8*b*, FIG. 9A and FIG. 9B, FIG. 10A and FIG. 10B, or FIG. 11, sending and/or receiving actions performed by the tag aggregation network element in FIG. 8*a*, FIG. 8*b*, FIG. 9A and FIG. 9B, FIG. 10A and FIG. 10B, or FIG. 11, or sending and/or receiving actions performed by the tag device in FIG. 8a, FIG. 8b, FIG. 9A and FIG. 9B, FIG. 10A and FIG. 10B, or FIG. 11, and/or may be configured to perform another process for the technology described in this specification.

It should be noted that all related content of the steps in the foregoing method embodiments may be cited in function description of corresponding functional modules. Details are not described herein again.

Figure 13:
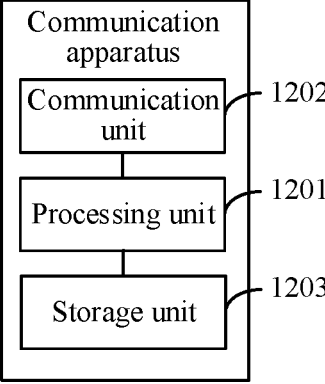

As shown in FIG. 13, a communication apparatus may further include a storage unit 1203, and the storage unit 1203 is configured to store program code and/or data of the communication apparatus.

A processing unit 1201 may include at least one processor. A communication unit 1202 may be a transceiver or a communication interface. The storage unit 1203 may include a memory.

An embodiment of this application provides a computer-readable storage medium. The computer-readable storage medium stores instructions. The instructions are for performing the method shown in FIG. 8a, FIG. 8b, FIG. 9A and FIG. 9B, FIG. 10A and FIG. 10B, or FIG. 11.

An embodiment of this application provides a computer program product including instructions. When the computer program product runs on a communication apparatus, the communication apparatus is enabled to perform the method shown in FIG. 8a, FIG. 8b, FIG. 9A and FIG. 9B, FIG. 10A and FIG. 10B, or FIG. 11.

An embodiment of this application provides a wireless communication apparatus. The wireless communication apparatus stores instructions. When the wireless communication apparatus is run on the communication apparatuses shown in FIG. 7a, FIG. 7b, FIG. 12, and FIG. 13, the communication apparatus is enabled to perform the method shown in FIG. 8a, FIG. 8b, FIG. 9A and FIG. 9B, FIG. 10A and FIG. 10B, or FIG. 11. The wireless communication apparatus may be a chip.

An embodiment of this application provides a communication system, including the access network device, the tag aggregation network element, and the access and mobility management network element that are described above.

The foregoing descriptions about implementations allow a person skilled in the art to understand that, for the purpose of convenient and brief description, division of the foregoing functional modules is used as an example for illustration. During actual application, the foregoing functions may be allocated to different functional modules and implemented based on requirements, that is, an inner structure of a communication apparatus is divided into different functional modules to implement all or some of the functions described above.

The processor in embodiments of this application may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to execute software instructions to perform an operation or processing. The processor may be an independent semiconductor chip, or may be integrated with another circuit into a semiconductor chip. For example, the processor may form a SoC (system-on-a-chip) with another circuit (such as a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the core configured to execute software instructions to perform the operation or processing, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto.

In this application, "at least one" refers to one or more. "Multiple" refers to two or more than two. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

In the several embodiments provided in this application, it should be understood that the disclosed database access apparatus and method may be implemented in other manners. For example, the described database access apparatus embodiment is merely an example. For example, division into the modules or the units is merely logical function division and there may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to a conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
determining, by a tag aggregation network element, whether security authentication on a tag device succeeds based on an identifier of the tag device and a 3rd generation partnership project (3GPP) network user identifier of the tag device, and the 3GPP network user identifier of the tag device identifies the tag device in a cellular communication network, wherein determining, by the tag aggregation network element, whether security authentication on the tag device succeeds based on the identifier of the tag device and the 3GPP network user identifier of the tag device comprises: when the 3GPP network user identifier of the tag device is obtained from an authentication device based on the identifier of the tag device, determining that security authentication on the tag device succeeds;
in response to determining, by the tag aggregation network element, that security authentication on the tag device succeeds, sending an operation instruction to a tag communication device, wherein the operation instruction indicates to the tag communication device to perform a communication operation with the tag device; and
before determining, by the tag aggregation network element, that security authentication on the tag device succeeds, sending, by the tag aggregation network element, at least one of the following to an access and mobility management network element: a protocol parameter, a communication parameter, or an access parameter, wherein:
the protocol parameter indicates a communication protocol between the tag communication device and the tag device or a communication protocol between the tag communication device and the tag aggregation network element, the communication parameter is for supporting the tag communication device in configuring a data transmission rate or a decoding scheme used for communication with the tag device, and the access parameter is used by the tag communication device to configure a rule of a tag device access event, wherein the rule of the tag device access event comprises at least one of the following: trigger time of the tag device accessing event, a periodicity of the tag device access event, or a quantity of tag devices corresponding to the tag device access event.

2. The method according to claim 1, further comprising:
sending, by the authentication device, the 3GPP network user identifier of the tag device to the tag aggregation network element.

3. The method according to claim 2, further comprising:
receiving, by the access and mobility management network element, a first message from the tag communication device, wherein the first message comprises the 3GPP network user identifier of the tag device; and
sending, by the access and mobility management network element, the 3GPP network user identifier to the authentication device.

4. The method according to claim 3, wherein the first message further comprises type information, and the type information indicates a type of the tag device.

5. The method according to claim 1, further comprising:
receiving, by the access and mobility management network element, the at least one of the following from the tag aggregation network element: the protocol parameter, the communication parameter, or the access parameter; and
sending, by the access and mobility management network element, a second message to the tag communication device, wherein the second message comprises at least one of the protocol parameter, the communication parameter, or the access parameter.

6. The method according to claim 3, further comprising:
obtaining, by the tag communication device, the identifier of the tag device;
determining, by the tag communication device, the 3GPP network user identifier based on the identifier of the tag device; and
sending, by the tag communication device, the first message to the access and mobility management network element.

7. A communication apparatus, comprising:
at least one memory and at least one processor coupled to the at least one memory storing instructions, wherein the instructions, when executed by the at least one processor, cause the communication apparatus to perform operations comprising:
determining whether security authentication on a tag device succeeds based on an identifier of the tag device and a 3rd generation partnership project (3GPP) network user identifier of the tag device, and the 3GPP network user identifier of the tag device identifies the tag device in a cellular communication network, wherein determining whether security authentication on the tag device succeeds based on the identifier of the tag device and the 3GPP network user identifier of the tag device comprises: when the 3GPP network user identifier of the tag device is obtained from an authentication device based on the identifier of the tag device, determining that security authentication on the tag device succeeds;
in response to determining that security authentication on the tag device succeeds, sending an operation instruction to a tag communication device, wherein the operation instruction indicates to the tag communication device to perform a communication operation with the tag device; and sending at least one of the following to an access and mobility management network element: a protocol parameter, a communication parameter, or an access parameter, wherein:

the protocol parameter indicates a communication protocol between the tag communication device and the tag device or a communication protocol between the tag communication device and the communication apparatus, the communication parameter is for supporting the tag communication device in configuring a data transmission rate or a decoding scheme used for communication with the tag device, and the access parameter is used by the tag communication device to configure a rule of a tag device access event, wherein the rule of the tag device access event comprises at least one of the following: trigger time of the tag device access event, a periodicity of the tag device access event, or a quantity of tag devices corresponding to the tag device access event.

8. The communication apparatus according to claim 7, wherein the operations further comprise:

obtaining the 3GPP network user identifier corresponding to the identifier of the tag device from the authentication device.

9. A system, comprising:

a tag aggregation network element;

an access and mobility management network element; and an authentication device, wherein the tag aggregation network element is configured to:

determine whether security authentication on a tag device succeeds based on an identifier of the tag device and a 3rd generation partnership project (3GPP) network user identifier of the tag device, and the 3GPP network user identifier of the tag device identifies the tag device in a cellular communication network;

in response to determining that security authentication on the tag device succeeds, send an operation instruction to a tag communication device, wherein the operation instruction indicates to the tag communication device to perform a communication operation with the tag device, wherein determining whether security authentication on the tag device succeeds based on the identifier of the tag device and the 3GPP network user identifier of the tag device comprises: when the 3GPP network user identifier of the tag device is obtained from the authentication device based on the identifier of the tag device, determining that security authentication on the tag device succeeds; and send at least one of the following to the access and mobility management network element: a protocol parameter, a communication parameter, or an access parameter;

wherein the authentication device is configured to:

send the 3GPP network user identifier of the tag device to the tag aggregation network element; and wherein the access and mobility management network element is configured to:

receive the at least one of the protocol parameter, the communication parameter, or the access parameter, and wherein:

the protocol parameter indicates a communication protocol between the tag communication device and the tag device or a communication protocol between the tag communication device and the tag aggregation network element, the communication parameter is for supporting the tag communication device in configuring a data transmission rate and/or a decoding scheme used for communication with the tag device, and the access parameter is used by the tag communication device to configure a rule of a tag device access event, wherein the rule of the tag device access event comprises at least one of the following: trigger time of the tag device access event, a periodicity of the tag device access event, or a quantity of tag devices corresponding to the tag device access event.

10. The system according to claim 9, further comprising:

an access and mobility management network element, wherein the access and mobility management network element is configured to:

receive a first message from the tag communication device, wherein the first message comprises the 3GPP network user identifier of the tag device; and send the 3GPP network user identifier to the authentication device.

11. The system according to claim 10, wherein the first message further comprises type information, and the type information indicates a type of the tag device.

12. The system according to claim 10, further comprising:

the tag communication device, configured to:

obtain the identifier of the tag device, and determine the 3GPP network user identifier of the tag device based on the identifier of the tag device; and send the first message to the access and mobility management network element.

13. The method according to claim 1, further comprising:

receiving, by an access network device, the identifier of the tag device from the tag communication device;

determining, by the access network device, the 3GPP network user identifier based on the identifier of the tag device; and sending, by the access network device, the 3GPP network user identifier to the access and mobility management network element.

14. The method according to claim 1, wherein the identifier of the tag device comprises a secret identifier (SID) of the tag device or an electronic product code (EPC) of the tag device.

15. The communication apparatus according to claim 7, wherein:

the tag communication device sends the identifier of the tag device to an access network device;

the access network device determines the 3GPP network user identifier based on the identifier of the tag device; and the access network device sends the 3GPP network user identifier to the access and mobility management network element.

16. The communication apparatus according to claim 7, wherein the identifier of the tag device comprises a secret identifier (SID) of the tag device or an electronic product code (EPC) of the tag device.

17. The system according to claim 9, wherein the 3GPP network user identifier of the tag device comprises a subscription concealed identifier (SUCI) or a subscription permanent identifier (SUPI).

18. The system according to claim 9, wherein the identifier of the tag device comprises a secret identifier (SID) of the tag device or an electronic product code (EPC) of the tag device.

\* \* \* \* \*